United States Patent
Aoki et al.

(10) Patent No.: US 10,403,965 B2
(45) Date of Patent: Sep. 3, 2019

(54) MOBILE COMMUNICATION TERMINAL AND CASE COVER

(71) Applicant: PANASONIC INTELLECTUAL PROPERTY MANAGEMENT CO., LTD., Osaka (JP)

(72) Inventors: Kouta Aoki, Kanagawa (JP); Haruo Hayakawa, Kanagawa (JP); Momoko Hiranuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 15/264,317

(22) Filed: Sep. 13, 2016

(65) Prior Publication Data

US 2017/0005396 A1 Jan. 5, 2017

Related U.S. Application Data

(63) Continuation of application No. PCT/JP2015/000816, filed on Feb. 20, 2015.

(30) Foreign Application Priority Data

Mar. 20, 2014 (JP) ................. 2014-058928

(51) Int. Cl.
*H01Q 1/24* (2006.01)
*H01Q 3/04* (2006.01)
(Continued)

(52) U.S. Cl.
CPC .............. *H01Q 1/243* (2013.01); *H01Q 1/36* (2013.01); *H01Q 1/50* (2013.01); *H01Q 9/30* (2013.01);
(Continued)

(58) Field of Classification Search
CPC .. H01Q 3/04; H01Q 3/05; H01Q 3/08; H01Q 3/12; H01Q 9/30; H01Q 21/24;
(Continued)

(56) References Cited

U.S. PATENT DOCUMENTS 6,324,380 B1 11/2001 Kiuchi et al.
6,947,762 B1 9/2005 Kuramoto
(Continued)

FOREIGN PATENT DOCUMENTS

JP   H10-243453 A   9/1998
JP   2000-049643 A   2/2000
(Continued)

OTHER PUBLICATIONS

International Search Report in International Patent Application No. PCT/JP2015/000816, dated Apr. 7, 2015; with partial Enlish translation.

*Primary Examiner* — Daniel Munoz
*Assistant Examiner* — Patrick R Holecek
(74) *Attorney, Agent, or Firm* — McDermott Will & Emery LLP

(57) ABSTRACT

The mobile communication terminal includes a case, a display unit, an antenna element having a feeding point for receiving electric power near an end, and a substrate. A plate-like member is disposed so as to be in close to or in contact with the end where the antenna element of the mobile communication terminal is disposed to be close thereto. The plate-like member may be a case cover. The plate-like member includes a long coupling element which has a length of about λ/2 or more with respect to a communication wavelength λ and stored in the plate-like member. When one end of the case of the mobile communication terminal is placed near the coupling element, the antenna element and the coupling element can be capacitively (Continued)

coupled to each other, so that radiation power in a specific direction is increased, and thus, a directivity gain is improved.

2 Claims, 28 Drawing Sheets

(51) Int. Cl.
*H01Q 9/30* (2006.01)
*H01Q 21/24* (2006.01)
*H01Q 19/28* (2006.01)
*H01Q 19/22* (2006.01)
*H01Q 1/36* (2006.01)
*H01Q 1/50* (2006.01)
*H04M 1/725* (2006.01)

(52) U.S. Cl.
CPC .......... *H01Q 19/22* (2013.01); *H01Q 19/28* (2013.01); *H01Q 21/24* (2013.01); *H04M 1/72527* (2013.01)

(58) Field of Classification Search
CPC ........ H01Q 21/245; H01Q 21/29; H01Q 1/24; H01Q 1/241; H01Q 1/242; H01Q 1/243; H01Q 1/244; H01Q 1/245; H01Q 1/36; H01Q 1/50; H01Q 1/40; H01Q 1/405; H01Q 1/42; H01Q 1/427; H01Q 1/428; H01Q 1/44; H01Q 5/30; H01Q 5/307; H01Q 5/378; H01Q 5/392
See application file for complete search history.

(56) References Cited

U.S. PATENT DOCUMENTS

| | | | |
|---|---|---|---|
| 6,985,110 B2* | 1/2006 | Tanaka | H01Q 1/242 343/702 |
| 8,355,761 B2* | 1/2013 | Harada | H01Q 1/243 455/575.1 |
| 2004/0046694 A1 | 3/2004 | Chiang et al. | |
| 2005/0156797 A1 | 7/2005 | Chiang et al. | |
| 2005/0206573 A1 | 9/2005 | Ligusa et al. | |
| 2007/0046542 A1 | 3/2007 | Andrenko et al. | |
| 2007/0152892 A1 | 7/2007 | Chiang et al. | |
| 2008/0088510 A1 | 4/2008 | Murata et al. | |
| 2008/0158086 A1 | 7/2008 | Yamagajo et al. | |

FOREIGN PATENT DOCUMENTS

| | | |
|---|---|---|
| JP | 2000-151264 A | 5/2000 |
| JP | 2003-179674 A | 6/2003 |
| JP | 2004-088185 A | 3/2004 |
| JP | 2005-521289 A | 7/2005 |
| JP | 2007-067543 A | 3/2007 |
| JP | 2008-011377 A | 1/2008 |
| JP | 2008-035219 A | 2/2008 |
| JP | 4173453 B2 | 10/2008 |
| JP | 2008-312263 A | 12/2008 |
| JP | 2009-273011 A | 11/2009 |
| JP | 2009-276912 A | 11/2009 |
| JP | 4444215 B2 | 3/2010 |
| JP | 2010-226605 A | 10/2010 |
| JP | 2011-071832 A | 4/2011 |
| JP | 2014-041410 A | 3/2014 |

* cited by examiner

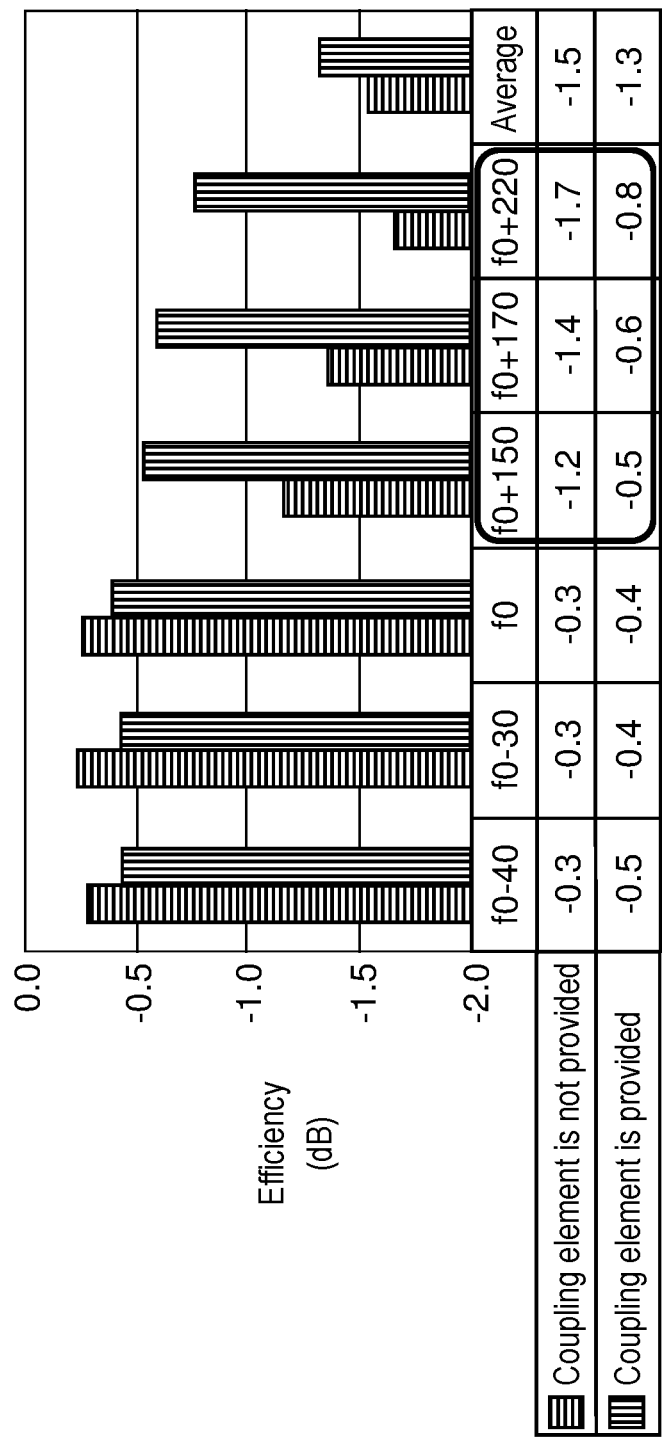

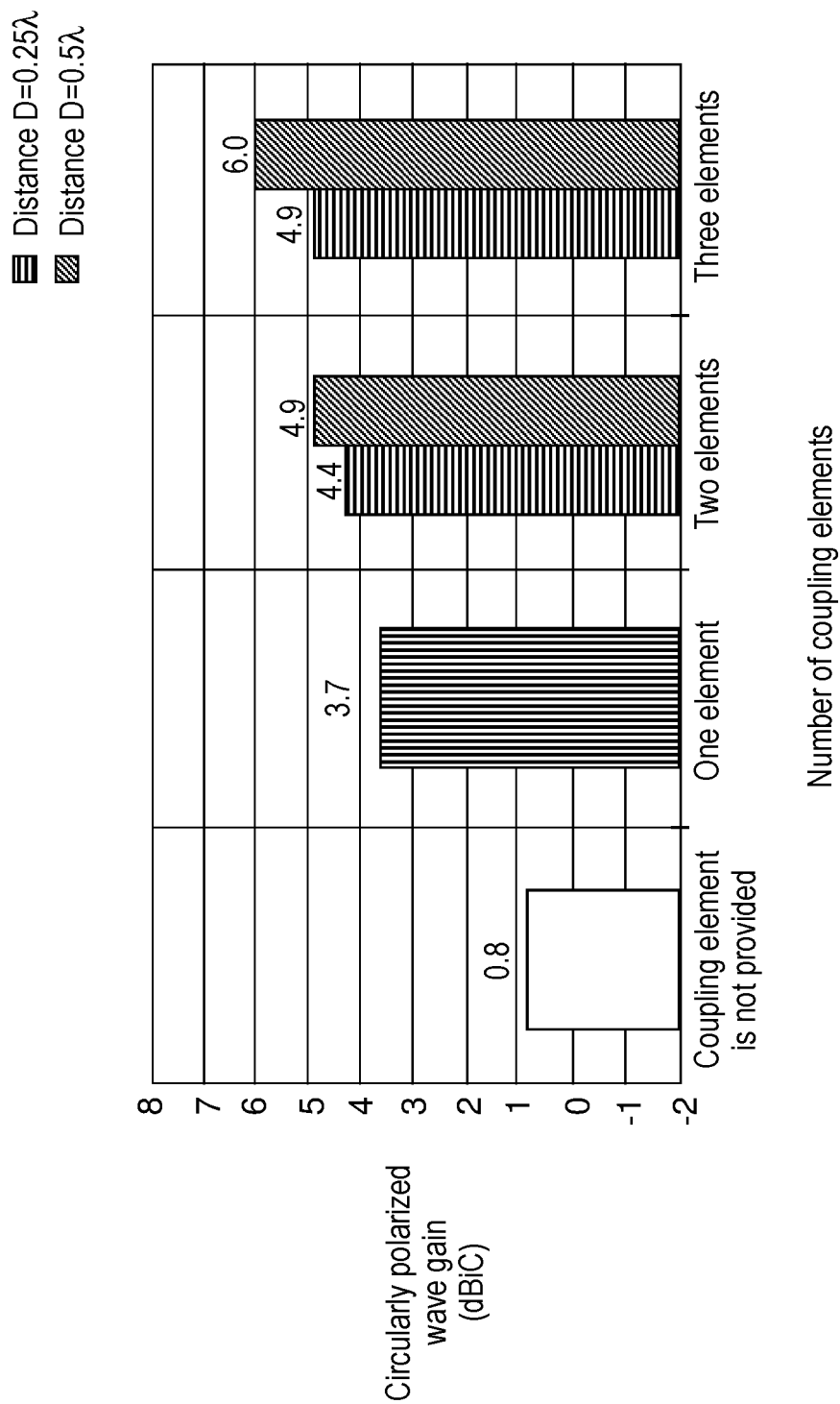

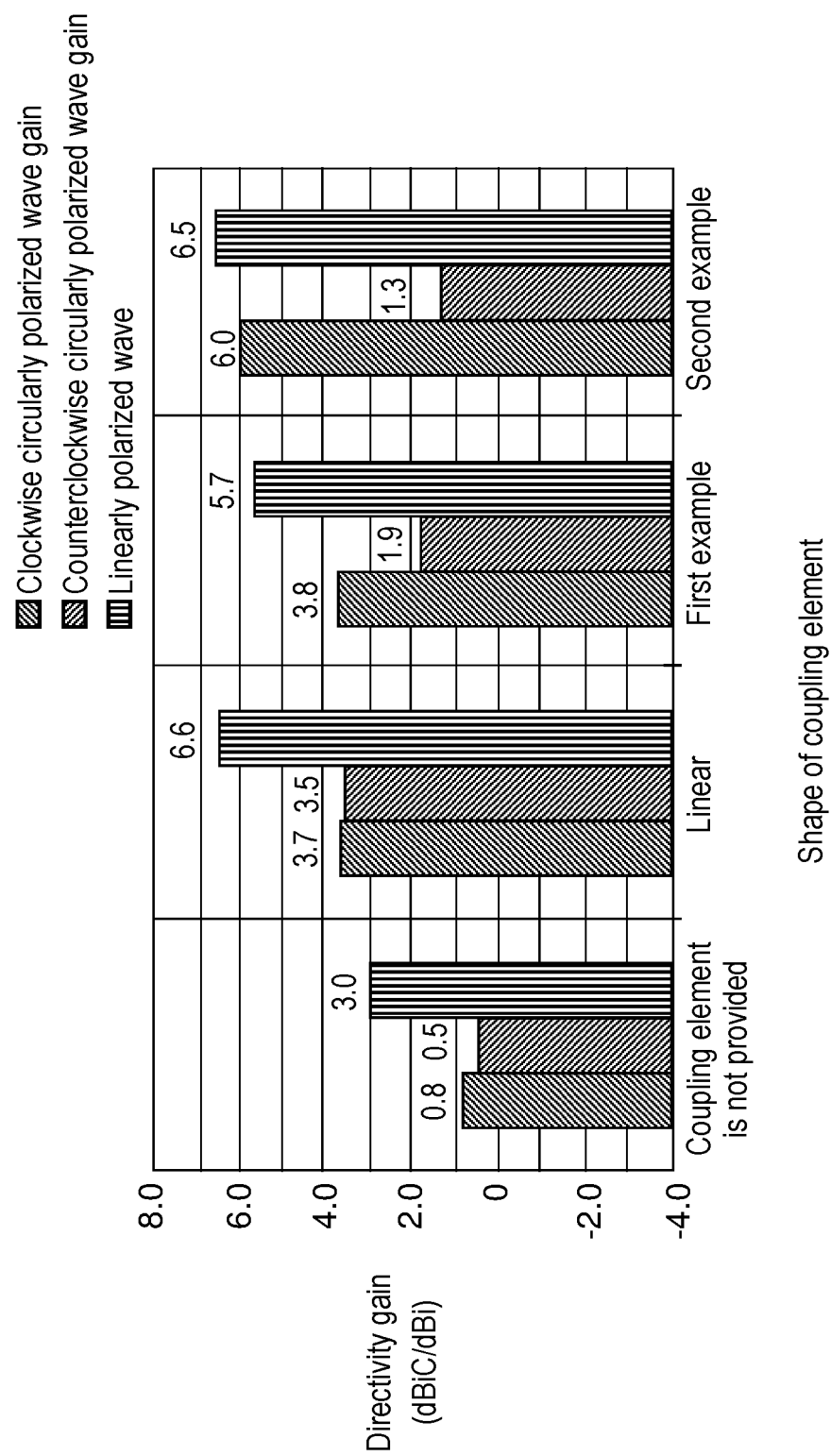

FIG. 27
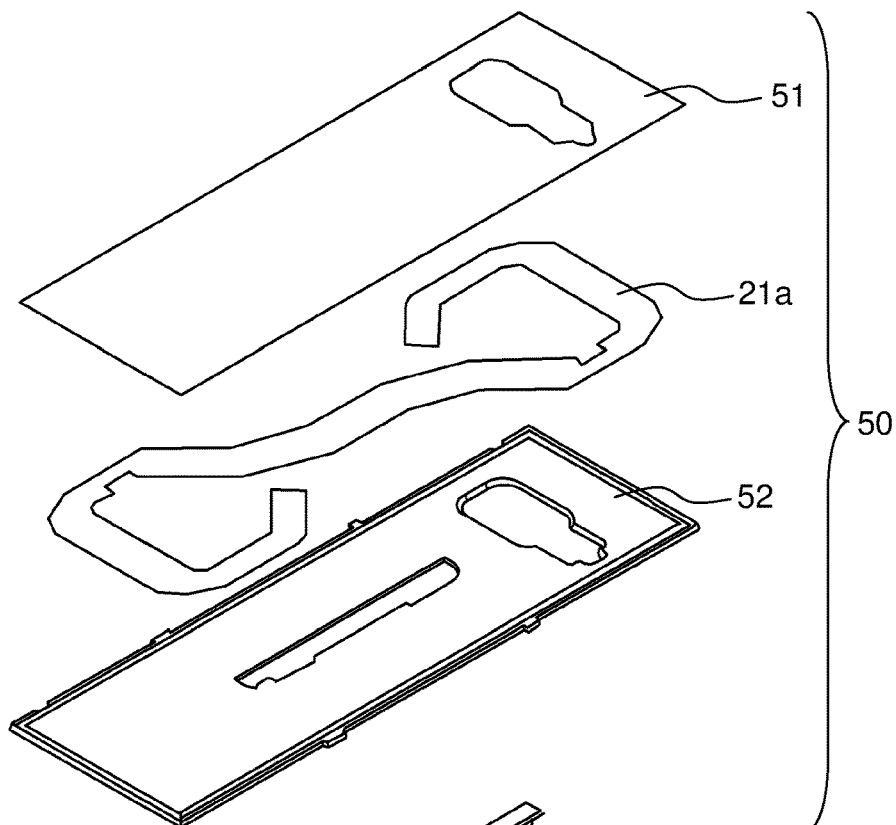
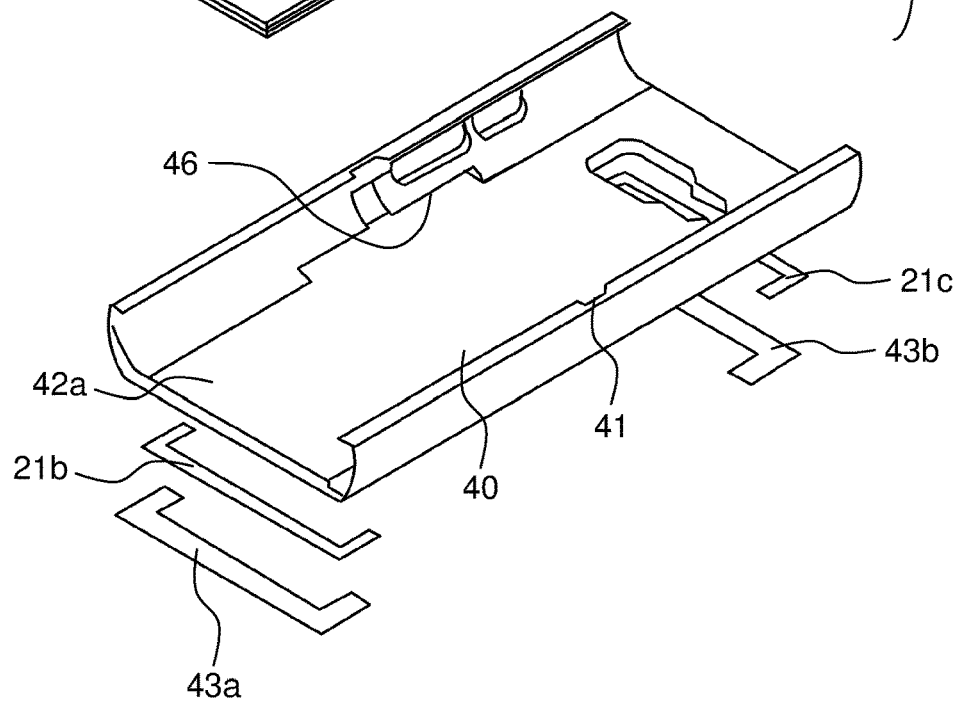

MOBILE COMMUNICATION TERMINAL AND CASE COVER

RELATED APPLICATIONS

This application is a Continuation of International Patent Application No. PCT/JP2015/000816, filed on Feb. 20, 2015, which in turn claims the benefit of Japanese Application No. 2014-058928, filed on Mar. 20, 2014, the disclosures of which Applications are incorporated by reference herein.

BACKGROUND

1. Technical Field

The present disclosure relates to a mobile communication terminal and a case cover that is attachable to the mobile communication terminal.

2. Description of Related Art

Satellite cell-phone services for performing communication with a geostationary satellite arranged in the zenith direction by using a mobile communication terminal have been running. A high-gain antenna having directivity in the zenith direction is required for the satellite communication services. A linearly polarized wave is generally used for terrestrial wireless communication. On the other hand, in the satellite communication, a polarized wave direction is changed according to an attitude of a satellite, and hence, reception becomes difficult. Therefore, a clockwise circularly polarized wave has widely been used. Accordingly, an antenna of a satellite mobile terminal is demanded to be adapted to a clockwise circularly polarized wave and have a high gain in the zenith direction. On the other hand, an antenna for a terrestrial communication network is demanded to have uniformly a high gain in the substantially horizontal direction rather than in the zenith direction. Therefore, an antenna configuration adapted to both the terrestrial communication network and the satellite communication is difficult.

Japanese Translation of PCT Publication No. 2005-521289, Japanese Patent No. 4,173,453, and Japanese Patent No. 4,444,215 disclose a technique of switching directivity by improving an antenna (feeding element) or the like.

Japanese Translation of PCT Publication No. 2005-521289 discloses a mobile phone handset including at least one passive antenna element (parasitic) and one active antenna element (feeding element) adjacent to the passive antenna element protruding from a housing, wherein a circuit element (reactance element) is connected to the passive antenna element, and a constant of the circuit element is changed to change directivity. Further, Japanese Patent No. 4,173,453 discloses an antenna apparatus that changes capacitance of at least one of a feeding element provided on a dielectric substrate and having a length of $\lambda/4$, parasitic elements, which are provided on both sides of the feeding element, include a variable reactance element, and are configured of one or more slots, and the variable reactance element, so as to switch directivity. In addition, Japanese Patent No. 4,444,215 discloses a mobile wireless device and an antenna unit provided in the mobile wireless device, including a parasitic element at a position facing a dipole antenna, the parasitic element being provided such that the relation of m>k is established, where k is a distance of a straight line linking the center point of the dipole antenna and a point on the parasitic element facing the center point, and m is a distance of a straight line linking one end of the parasitic element and a point of the dipole antenna facing this one end. With this configuration, directivity in the direction opposite to an obstacle such as a human body can be obtained, and hence, a high gain can be achieved.

SUMMARY

The techniques disclosed in Japanese Translation of PCT Publication No. 2005-521289, Japanese Patent No. 4,173,453, and Japanese Patent No. 4,444,215 are made for changing directivity of an antenna by improving an antenna or the like of a mobile communication terminal. However, these techniques need additional circuit elements, such as a reactance element, for an existing antenna element provided to a mobile communication terminal such as a smartphone, and a circuit that controls these circuit elements. Further, a space for disposing a parasitic element in a case is needed, and this leads to an increase in size of the mobile communication terminal. Further, directivity of an antenna can be switched by supplying electric power to an antenna device, separate from a mobile communication terminal, with a physical connection such as a cable or a card. However, when a connection terminal for supplying electric power to the separate antenna device is provided to the mobile communication terminal, the size of the mobile communication terminal is increased, and the separate antenna device has to be always carried. Therefore, this configuration has a problem in portability and usability.

The present disclosure aims to provide a mobile communication terminal and a case cover having a high directivity gain by using an existing antenna element without changing an antenna configuration at an end of an existing mobile communication terminal at all.

A mobile communication terminal according to the present disclosure includes: a case; an antenna element that is stored to be close to one of ends at an inside of the case and has a feeding point that receives electric power; a substrate that is disposed in the case to be extended from the antenna element in a direction away from one end of the case, and has a conductor which is connected to the antenna element to function as a ground for the antenna element; and a long coupling element that is separately provided independently of the case and has a length of about $\lambda/2$ or more with respect to a communication wavelength $\lambda$, wherein one end of the case is placed near the coupling element, so that the antenna element and the coupling element are capacitively coupled to each other.

According to one aspect of the mobile communication terminal of the present disclosure, the coupling element is an antenna adapted to a circularly polarized wave, for example.

According to one aspect of the mobile communication terminal of the present disclosure, the coupling element is provided on a non-conductive plate-like member which is separately provided independently of the case, for example.

According to one aspect of the mobile communication terminal of the present disclosure, the coupling element includes a first coupling element provided on the plate-like member and a second coupling element provided on the plate-like member with a predetermined space from the first coupling element, and one end of the case is placed near the first coupling element, so that the antenna element and the first and second coupling elements are capacitively coupled, for example.

According to one aspect of the mobile communication terminal of the present disclosure, the coupling element further includes a third coupling element which is different from the first coupling element and the second coupling element, the third coupling element being provided at a position, which is opposite to the second coupling element with respect to the first coupling element, on the plate-like member with a predetermined space from the first coupling element, and one end of the case is placed near the first coupling element, so that the antenna element and the first, second, and third coupling elements are capacitively coupled, for example.

According to one aspect of the mobile communication terminal of the present disclosure, each of the second coupling element and the third coupling element has a linear body part and bent parts bent at about 90 degrees at both ends of the body part, for example.

According to one aspect of the mobile communication terminal of the present disclosure, a plurality of the second coupling elements and a plurality of the third coupling elements are provided, for example.

According to one aspect of the mobile communication terminal of the present disclosure, an extended line of a part of the coupling element in an extending direction obliquely crosses a longitudinal direction of the antenna element, when one end of the case is placed near the coupling element, and the coupling element includes at least a tilt part having an open terminal end, for example.

According to one aspect of the mobile communication terminal of the present disclosure, the coupling element has an S shape or a reversed S shape in a plan view, for example.

According to one aspect of the mobile communication terminal of the present disclosure, the plate-like member is configured of a case cover attached to the case, for example.

According to one aspect of the mobile communication terminal of the present disclosure, the case cover includes a body part directly mounted to the case, and an antenna part including the coupling element, for example.

A case cover according to the present disclosure is a case cover attachable to a mobile communication terminal, the case cover including: a body part that is directly attachable to a case of the mobile communication terminal; and a long coupling element that is able to be capacitively coupled to an antenna element, which is stored so as to be close to any one of ends at an inside of the case and has a feeding point for receiving electric power, the coupling element having a length of about $\lambda/2$ or more with respect to a communication wavelength $\lambda$, wherein the coupling element is mounted to the body part, and one end of the case of the mobile communication terminal is placed near the coupling element, so that capacitive coupling between the antenna element and the coupling element is enabled.

According to one aspect of the case cover of the present disclosure, the case cover includes an antenna part that is mounted to the body part so as to be relatively movable and includes the coupling element, wherein, in a case where one end of the case of the mobile communication terminal is placed near the coupling element, the antenna part is disposed so as to be relatively substantially orthogonal to the body part, for example.

According to one aspect of the case cover of the present disclosure, the antenna part is mounted to the body part so as to be relatively turnable, for example.

In the mobile communication terminal and the case cover according to the present disclosure, the coupling element having a length of about $\lambda/2$ or more with respect to the communication wavelength $\lambda$ is provided below the antenna element so as to be close to the antenna element with a predetermined distance, and they are capacitively coupled to each other, so that radiation power in a specific direction, particularly in the longitudinal direction of the case and the zenith direction, is increased by utilizing an existing antenna element with no cable connection without changing an antenna configuration at the end of an existing mobile communication terminal at all. Thus, a directivity gain can be improved. In addition, wider bandwidth can be obtained, and efficiency can be improved. Further, due to the improvement in the directivity gain in the zenith direction, satellite communication with a satellite in the zenith direction is enabled, and utility value can be increased, if a terrestrial communication network is unable to be used in the event of a disaster.

BRIEF DESCRIPTION OF THE DRAWINGS

FIG. 5 is a bar graph illustrating a comparison in efficiency between the case where a coupling element is provided and the case where a coupling element is not provided in the first exemplary embodiment of the mobile communication terminal according to the present disclosure;

FIG. 13 is a bar graph illustrating a comparison in a directivity gain of a clockwise circularly polarized wave based on a number of coupling elements and a distance in the third exemplary embodiment of the mobile communication terminal according to the present disclosure;

FIG. 20 is a bar graph illustrating a comparison in a directivity gain of a clockwise circularly polarized wave, a counterclockwise circularly polarized wave, and a linearly polarized wave based on a shape of a coupling element in the sixth exemplary embodiment of the mobile communication terminal according to the present disclosure;

FIG. 27 is an exploded perspective view illustrating one example of a third exemplary embodiment of the case cover according to the present disclosure;

DETAILED DESCRIPTION

Preferable exemplary embodiments of a mobile communication terminal and a case cover according to the present disclosure will be described in detail below with reference to FIGS. 1A to 28C.

1. Mobile Communication Terminal

First Exemplary Embodiment

Figure 1A:
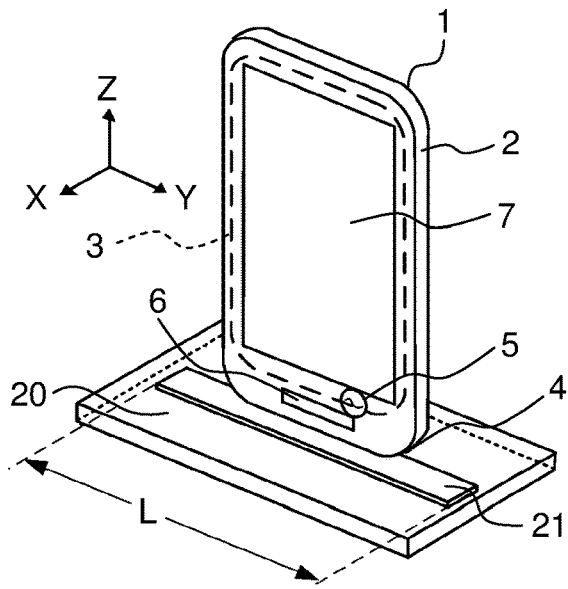
FIG. 1A is a front perspective view illustrating one example of a first exemplary embodiment of a mobile communication terminal according to the present disclosure.
Figure 1B:
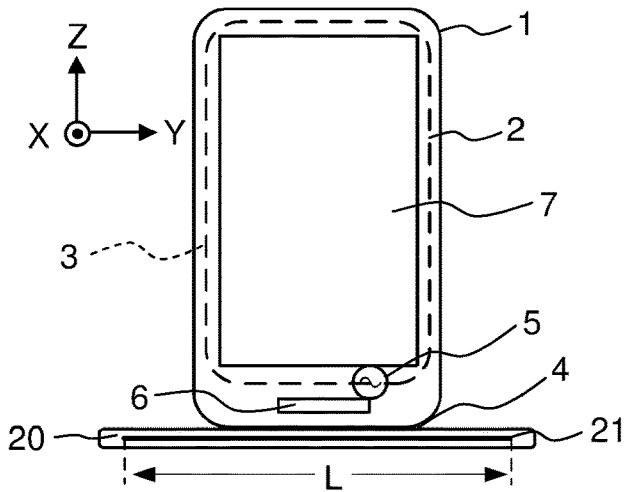
FIG. 1B is a front view illustrating one example of the first exemplary embodiment of the mobile communication terminal according to the present disclosure.
Figure 1C:
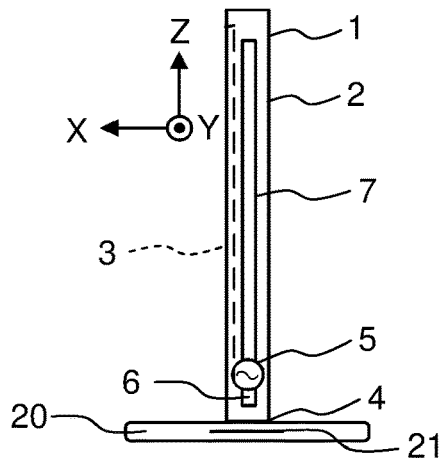
FIG. 1C is a right side view illustrating one example of the first exemplary embodiment of the mobile communication terminal according to the present disclosure.

One example of a first exemplary embodiment of a mobile communication terminal according to the present disclosure will be described with reference to FIGS. 1A to 6B. FIG. 1A is a front perspective view, FIG. 1B is a front view, and FIG. 1C is a right side view.

Mobile communication terminal 1 is a communication terminal having a communication function, such as a smartphone, a tablet, a data communication terminal, and a mobile information device. In the present exemplary embodiment, a smartphone is illustrated as one example of mobile communication terminal 1. Mobile communication terminal 1 includes case 2, display unit 3 that is stored in case 2 and configured of a liquid crystal panel or the like, antenna element 6 which is stored in case 2 and has feeding point 5, which is fed with electric power, near end 4 (the lower part in the drawing) of case 2, and substrate 7. For clarifying the arrangement relation, the front-back direction of the display unit is defined as an X axis, the transverse direction of mobile communication terminal 1 at right angle to the X axis is defined as a Y axis, and the longitudinal direction of mobile communication terminal 1 vertical to the X axis is defined as a Z axis.

Antenna element 6 is a communication antenna necessary for establishing communication between mobile communication terminal 1 and a terrestrial base station such as a cellular phone. Antenna element 6 has an almost rectangular shape, and is disposed such that its longitudinal direction extends along the Y axis direction. Further, substrate 7 is disposed along the Z axis direction vertical to antenna element 6. Substrate 7 is configured of a conductor, disposed to be extended from antenna element 6 in the direction away from one end 4 of case 2, and connected to antenna element 6 in the vicinity of end 4 of case 2 to function as a ground of antenna element 6.

Substrate 7 may be configured of any one of layers of a multilayer print substrate as a substrate pattern, or may be a metal plate or the like provided between display unit 3 and substrate 7 (not illustrated) to reinforce display unit 3.

A monopole antenna is configured of antenna element 6, feeding point 5, and substrate 7, so that a linearly polarized wave having main components in the Y axis direction and the Z axis direction is radiated.

While end 4 is specified as a lower part of mobile communication terminal 1, end 4 may be changed according to the installment position of antenna element 6 to mobile communication terminal 1.

Plate-like member 20 is disposed so as to be in close to or in contact with end 4 of mobile communication terminal 1. Plate-like member 20 is formed from a resinous non-conductive material, for example, has a flat plate shape with an almost rectangular shape, and is provided separately from case 2. Also, plate-like member 20 may be later-described case cover 30 of case 2, or may be a component such as an accessory of mobile communication terminal 1. Plate-like member 20 includes long coupling element 21 stored in plate-like member 20 and having predetermined length L (length in the Y axis direction in the drawing). In the present exemplary embodiment, coupling element 21 is disposed to be close to antenna element 6 with a predetermined distance in the −Z axis direction, and illustrated as a pedestal or a supporting platform of mobile communication terminal 1.

An amount of coupling between antenna element 6 and coupling element 21 is increased by disposing antenna element 6 of mobile communication terminal 1 and coupling element 21 such that the longitudinal direction (Y axis direction) of antenna element 6 and the longitudinal direction of coupling element 21 are substantially parallel to each other, so that a wide-band antenna having synthesized directivity by mutual coupling can be formed. Specifically, antenna element 6 and coupling element 21 are capacitively coupled by placing one end 4 of case 2 near coupling element 21. Then, substrate 7, feeding point 5, antenna element 6, end 4, and coupling element 21 are disposed in order from the +Z axis direction on an almost straight line. In addition, when plate-like member 20 is held horizontally with a ground, for example, a radiation component of an electromagnetic wave radiated from substrate 7 and antenna element 6 in the +Y axis direction is mainly amplified by coupling element 21, so that directivity with a high gain in the zenith direction (+Z axis direction) can be obtained, and this is particularly effective for communication using a satellite on the zenith. That is, the direction of the directivity is determined depending on the positional relation among antenna element 6, substrate 7, and coupling element 21. Therefore, in a case where antenna element 6 and end 4 are defined as an upper part of mobile communication terminal 1, and coupling element 21 is disposed in the +Z axis direction with respect to antenna element 6, the directivity is in the direction toward the ground (in the −Z axis direction). Further, it is only necessary that mobile communication terminal 1 and plate-like member 20 are made close to each other, so that a physical feeding connection to mobile communication terminal 1 such as a coaxial line becomes unnecessary. Thus, existing mobile communication terminal 1 can be used.

Figure 2:
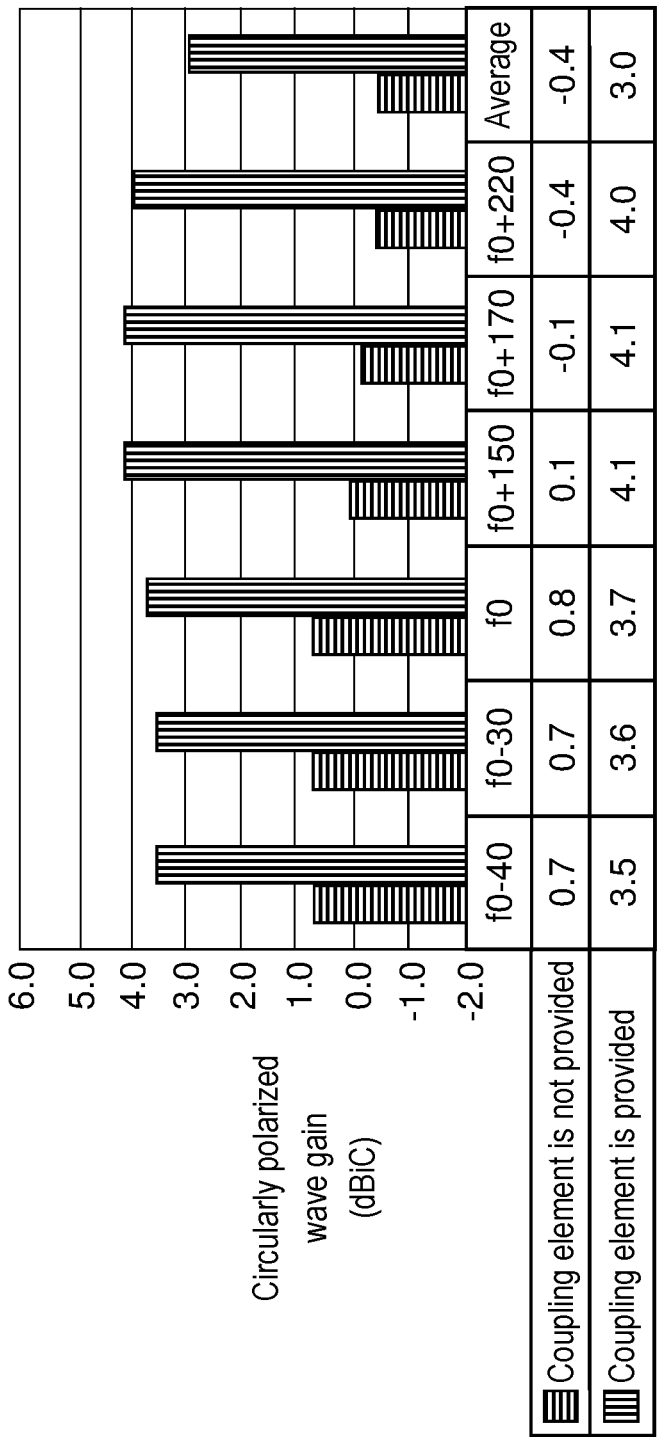
FIG. 2 is a bar graph illustrating a comparison in a directivity gain of a clockwise circularly polarized wave between the case where a coupling element is provided and the case where a coupling element is not provided in the first exemplary embodiment of the mobile communication terminal according to the present disclosure.

FIG. 2 is a bar graph illustrating a comparison in a directivity gain of a clockwise circularly polarized wave between the case where the coupling element is provided and the case where the coupling element is not provided. A vertical axis indicates a circularly polarized wave gain (dBiC), and a horizontal axis indicates a frequency which is the difference from a designed frequency f0 (MHz). Further, a bar graph with a horizontal stripe indicates the case where coupling element 21 is not provided, and a bar graph with a vertical stripe indicates the case where coupling element 21 is provided. Compared to the case where coupling element 21 is not provided, a directivity gain is obviously enhanced at any frequency due to the presence of coupling element 21.

Figure 3A:
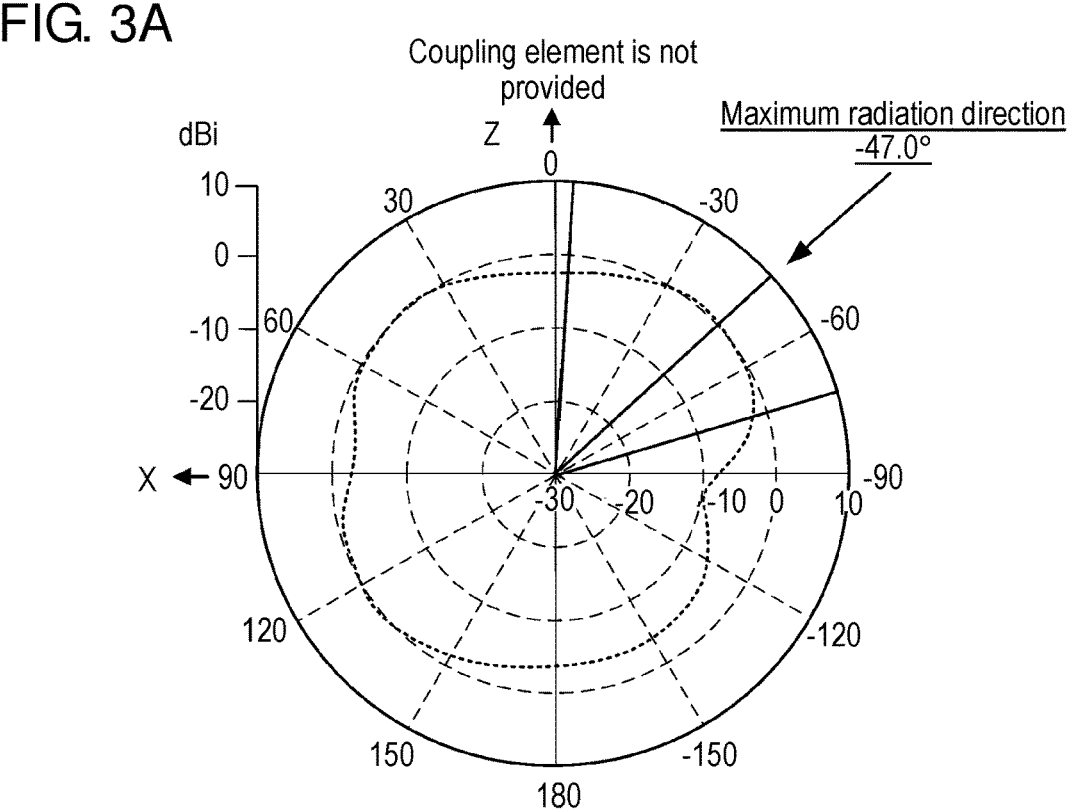
FIG. 3A is a radiation pattern diagram illustrating the case where a coupling element is not provided, out of radiation pattern diagrams illustrating a comparison in a clockwise circularly polarized wave between the case where a coupling element is provided and the case where a coupling element is not provided, in the first exemplary embodiment of the mobile communication terminal according to the present disclosure.
Figure 3B:
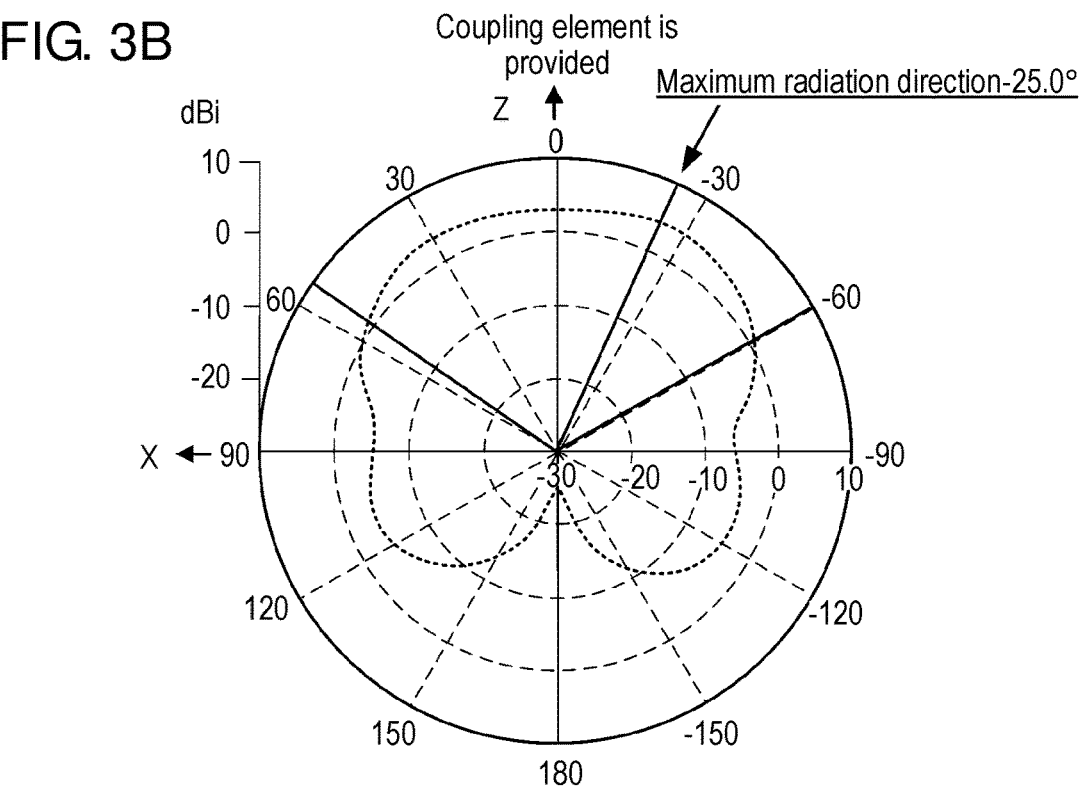
FIG. 3B is a radiation pattern diagram illustrating the case where a coupling element is provided, out of radiation pattern diagrams illustrating a comparison in a clockwise circularly polarized wave between the case where a coupling element is provided and the case where a coupling element is not provided, in the first exemplary embodiment of the mobile communication terminal according to the present disclosure.

FIGS. 3A and 3B are radiation pattern diagrams for illustrating a comparison in a clockwise circularly polarized wave between the case where coupling element is provided and the case where coupling element is not provided, wherein FIG. 3A is a radiation pattern diagram in the case where a coupling element is not provided, and FIG. 3B is a radiation pattern diagram in the case where a coupling element is provided. It is found that the radiation amount at −90° to +90° is increased in a case where coupling element 21 is provided, compared to the case where coupling element 21 is not provided, although the radiation amount at 90° to 180°, and 180° to 270° (−90°) is decreased. In a case where coupling element 21 is not provided, the maximum radiation direction in which the radiation amount becomes the maximum is −47.0°. On the other hand, in the case where coupling element 21 is provided, the maximum radiation direction becomes −25.0°. Accordingly, in the zenith direction, a directivity gain is enhanced due to the presence of coupling element 21, compared to the case where coupling element 21 is not provided. This indicates that coupling element 21 is effective for the communication with a satellite located in the zenith direction.

Figure 4:
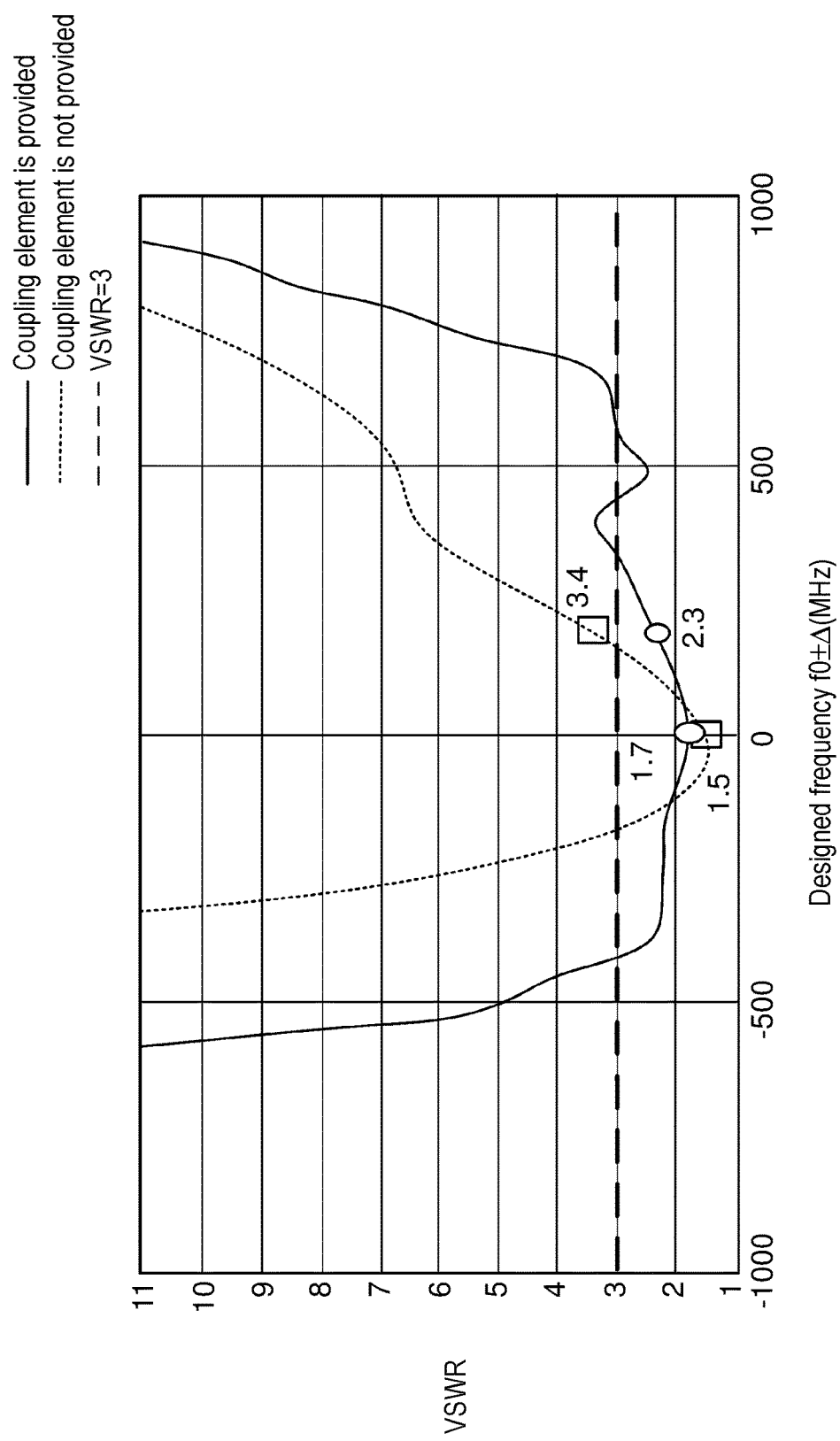
FIG. 4 is a line graph illustrating a comparison in a voltage standing wave ratio in a wide frequency band between the case where a coupling element is provided and the case where a coupling element is not provided in the first exemplary embodiment of the mobile communication terminal according to the present disclosure.

FIG. 4 is a line graph illustrating a comparison in a voltage standing wave ratio in a wide frequency band between the case where the coupling element is provided and the case where the coupling element is not provided. A vertical axis indicates a voltage standing wave ratio (VSWR), and a horizontal axis indicates a frequency (MHz) which is a difference from the designed frequency f0. A solid line indicates the case where coupling element 21 is provided, and a dotted line indicates the case where coupling element 21 is not provided. A reference line of VSWR=3 is indicated by a broken line.

In the case where coupling element 21 is not provided, the VSWR of the designed frequency f0 is 1.5. On the other hand, in the case where coupling element 21 is provided, the VSWR is 1.7. Thus, the VSWRs in both cases are almost equal to each other. The VSWR at the frequency band of f0+190 MHz is 3.4 in the case where coupling element 21 is not provided. On the other hand, in the case where coupling element 21 is provided, it is 2.3 that is lower than 3 defined as a reference, and better than the above case. A band ratio obtained by dividing the band width of VSWR=3 or lower by the designed frequency f0 is 17% in the case where coupling element 21 is not provided. On the other hand, in the case where coupling element 21 is provided, it is 38% by which wide-band communication of mobile communication terminal 1 is enabled.

FIG. 5 is a bar graph illustrating a comparison in efficiency between the case where the coupling element is provided and the case where the coupling element is not provided. A vertical axis indicates efficiency (dB), and a horizontal axis indicates a frequency which is the difference from a designed frequency f0 MHz. Further, a bar graph with a horizontal stripe indicates the case where coupling element 21 is not provided, and a bar graph with a vertical stripe indicates the case where coupling element 21 is provided. Particularly, the efficiency at the frequency band of f0+150 MHz to f0+220 MHz is improved. For example, at f0+170 MHz, the efficiency becomes −0.6 dB in the case where coupling element 21 is provided, compared to −1.4 dB in the case where coupling element 21 is not provided. This shows that the efficiency is improved by 0.8 dB in the case where coupling element 21 is provided. It can be understood from the graphs in FIGS. 4 and 5 that a wider bandwidth of mobile communication terminal 1 is enabled, and efficiency is improved, due to the presence of coupling element 21.

Figure 6A:
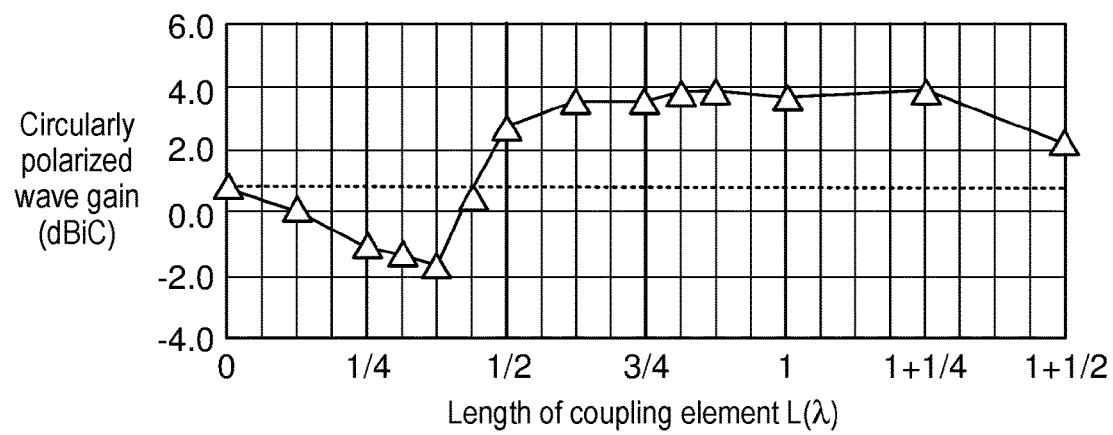
FIG. 6A is a line graph illustrating a change in a directivity gain of a clockwise circularly polarized wave according to a length of a coupling element and a comparison with the case where a coupling element is not provided in the first exemplary embodiment of the mobile communication terminal according to the present disclosure.
Figure 6B:
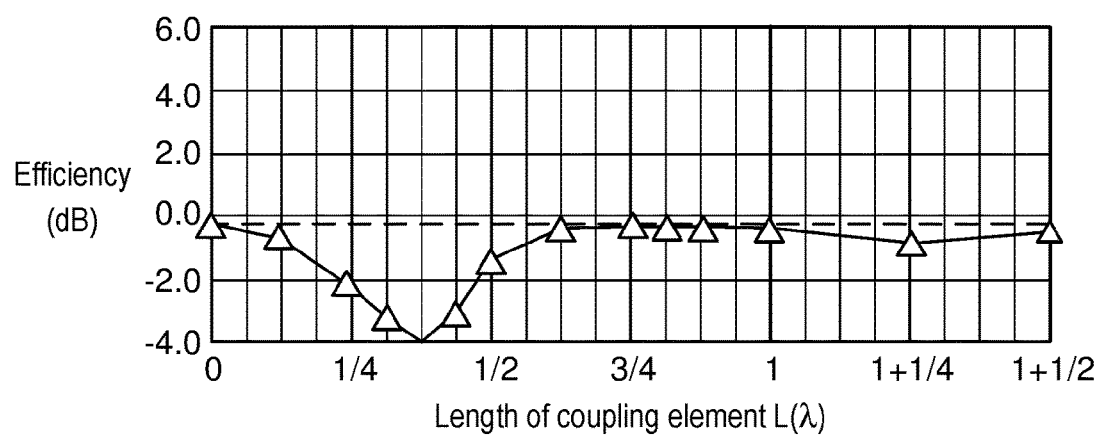
FIG. 6B is a line graph illustrating a change in efficiency according to a length of a coupling element and a comparison with the case where a coupling element is not provided in the first exemplary embodiment of the mobile communication terminal according to the present disclosure.

FIGS. 6A and 6B are line graphs illustrating a difference in a directivity gain and efficiency based on the length of the coupling element, wherein FIG. 6A illustrates the directivity gain of a clockwise circularly polarized wave and FIG. 6B illustrates the efficiency. In FIG. 6A, the vertical axis indicates a circularly polarized wave gain (dBiC), and a horizontal axis indicates length L of coupling element 21 with respect to communication wavelength λ. Further, in FIG. 6B, the vertical axis indicates the efficiency (dB), and the horizontal axis indicates length L of coupling element 21 with respect to communication wavelength λ. In FIGS. 6A and 6B, a solid line indicates the case where coupling element 21 is provided, and a broken line indicates the case where coupling element 21 is not provided.

It is found from the graphs in FIGS. 6A and 6B that, when length L of coupling element 21 is not more than 7/16 (<½) with respect to communication wavelength λ, the directivity gain and efficiency are more deteriorated than the case where coupling element 21 is not provided. Therefore, it is appropriate that length L of coupling element 21 is set to about λ/2 or more with respect to communication wavelength λ, and length L is most preferably set to about 1λ. This depends on an aspect in which an amplitude of a current flowing through coupling element 21 and a phase are changed according to length L of coupling element 21. When length L of coupling element 21 is set to be about λ/2 or more, the radiation direction of mobile communication terminal 1 is changed to improve the gain in the maximum radiation direction without the need to change the antenna configuration at the end of mobile communication terminal 1.

It should be noted that, although coupling element 21 is disposed such that its center is substantially aligned to the center of mobile communication terminal 1 in a plan view, so that the center of coupling element 21 and the center of antenna element 6 are shifted from each other in the first exemplary embodiment, it is desirable that the center of coupling element 21 and the center of antenna element 6 are exactly aligned to each other.

Further, the maximum radiation direction is changed by moving coupling element 21 in the Y axis direction, and the directivity can be tilted in the direction same as the Y axis direction in which the coupling element 21 is moved. For example, when the center position of coupling element 21 in the Y axis direction is changed to +0.25λ from −0.25λ to move coupling element 21 in the +Y axis direction, the maximum radiation direction, which is indicated by an angle from the +Z axis to the +X axis or +Y axis, on the Y-Z plane is changed to +25° from −10°, so that the directivity is tilted in the +Y axis direction. Thus, a desired satellite can be captured, as necessary, by changing the position of the coupling element according to an elevation angle at which the desired satellite is present.

Second Exemplary Embodiment

Figure 7A:
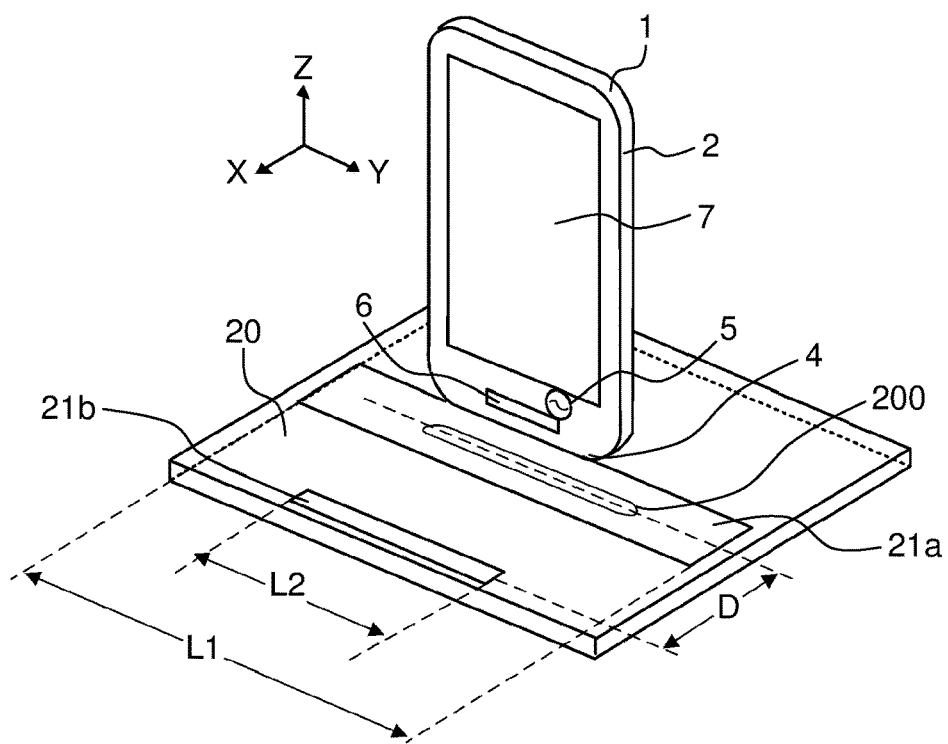
FIG. 7A is a front perspective view illustrating one example of a second exemplary embodiment of the mobile communication terminal according to the present disclosure.
Figure 7B:
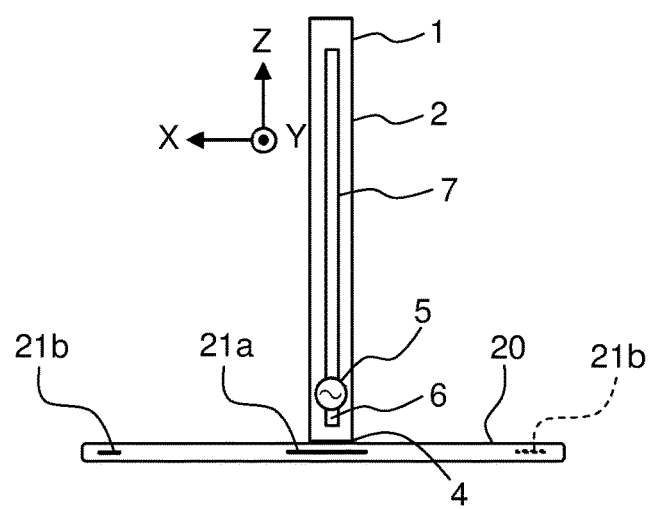
FIG. 7B is a right side view illustrating one example of the second exemplary embodiment of the mobile communication terminal according to the present disclosure.

FIGS. 7A to 11B illustrate one example of a second exemplary embodiment of the mobile communication terminal according to the present disclosure, wherein FIG. 7A is a front perspective view, and FIG. 7B is a right side view. Note that display unit 3 is not illustrated, and display unit 3 is similarly not illustrated in the succeeding drawings.

In the second exemplary embodiment, coupling element 21 in the first exemplary embodiment is specified as first coupling element 21a, and second coupling element 21b is provided in plate-like member 20 at the position different from first coupling element 21a. Further, in the second exemplary embodiment, second coupling element 21b is disposed ahead of (in the X axis direction) first coupling element 21a with a space (predetermined space) of distance D. Similar to first coupling element 21a, second coupling element 21b is also long (linear) and extends along the Y axis direction. Opening 200 is formed on a top surface of plate-like member 20, and mobile communication terminal 1 is mounted to plate-like member 20 at the position of opening 200.

The length of first coupling element 21a in the Y axis direction is defined as L1, the length of second coupling element 21b is defined as L2, and the distance between the center position of first coupling element 21a in the X axis direction and the center position of second coupling element 21b in the X axis direction is defined as D. Length L2 of second coupling element 21b and distance D are preferably about 1λ and λ/2, respectively.

Note that, although second coupling element 21b is disposed at the near side in the drawing, it may be disposed near the other end at the opposite side in the X axis direction (see second coupling element 21b indicated by a broken line in FIG. 7B).

Figure 8:
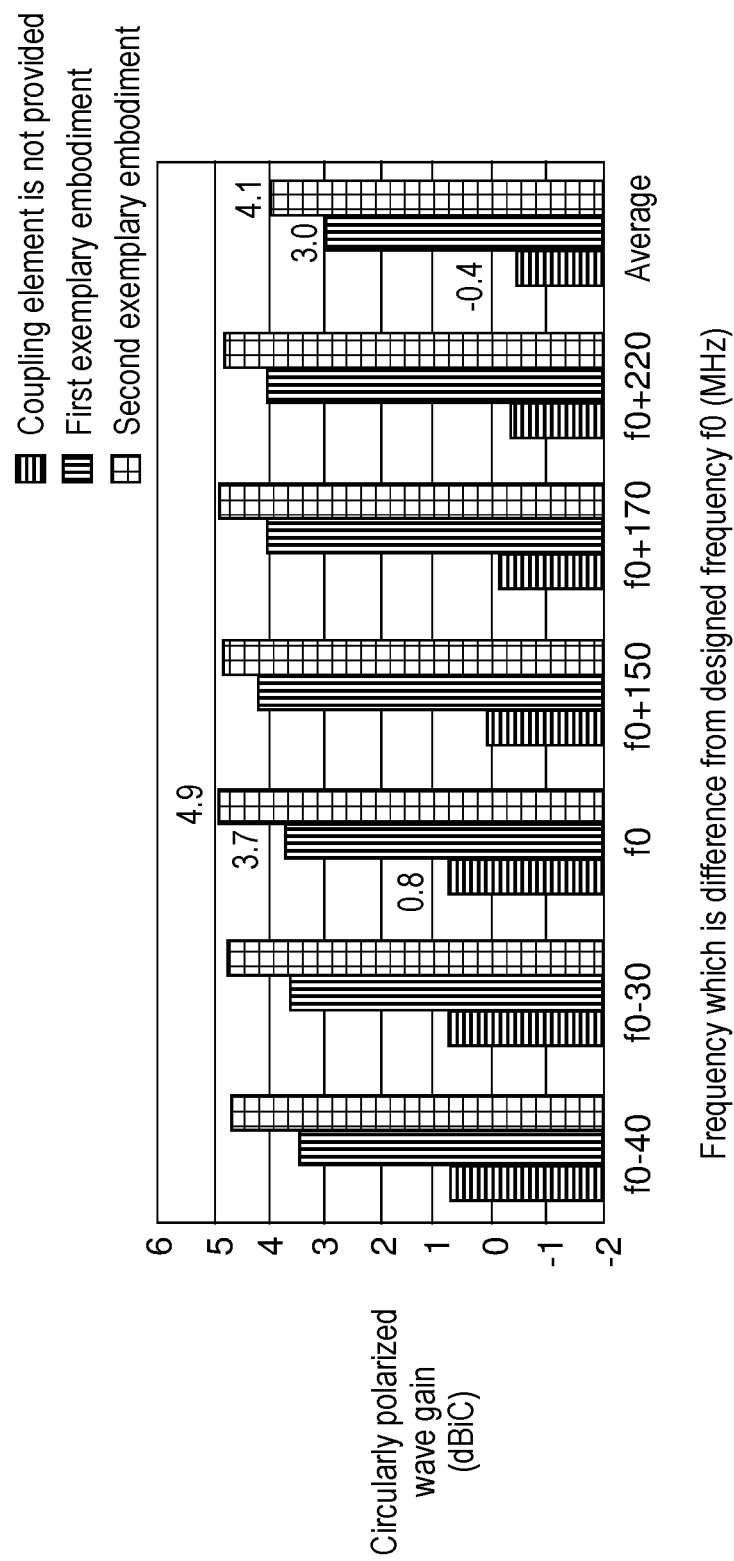
FIG. 8 is a bar graph illustrating a comparison in a directivity gain of a clockwise circularly polarized wave based on a number of coupling elements in the second exemplary embodiment of the mobile communication terminal according to the present disclosure.

FIG. 8 is a bar graph illustrating a comparison in a directivity gain of a clockwise circularly polarized wave based on the number of the coupling elements. A vertical axis indicates a circularly polarized wave gain (dBiC), and a horizontal axis indicates a frequency which is the difference from a designed frequency f0 (MHz). Further, a bar graph with a horizontal stripe indicates the case where coupling element 21 is not provided, a bar graph with a vertical stripe indicates the case where one coupling element 21 is provided as in the first exemplary embodiment, and a bar graph with a checkered pattern indicates the case where first coupling element 21a and second coupling element 21b are provided as in the second exemplary embodiment. FIG. 8 illustrates the result of the configuration in which length L1 of first coupling element 21a is set to be λ, length L2 of second coupling element 21b is set to be 0.47λ, and distance D is set to be λ/2. It is understood from this graph that, compared to the first exemplary embodiment, the circularly polarized wave gain is improved by 1.2 dB (=4.9−3.7) at the designed frequency f0 (MHz), improved by 1.1 dB (=4.1−3.0) in average, and also improved in the entire desired band in the second exemplary embodiment.

Figure 9:
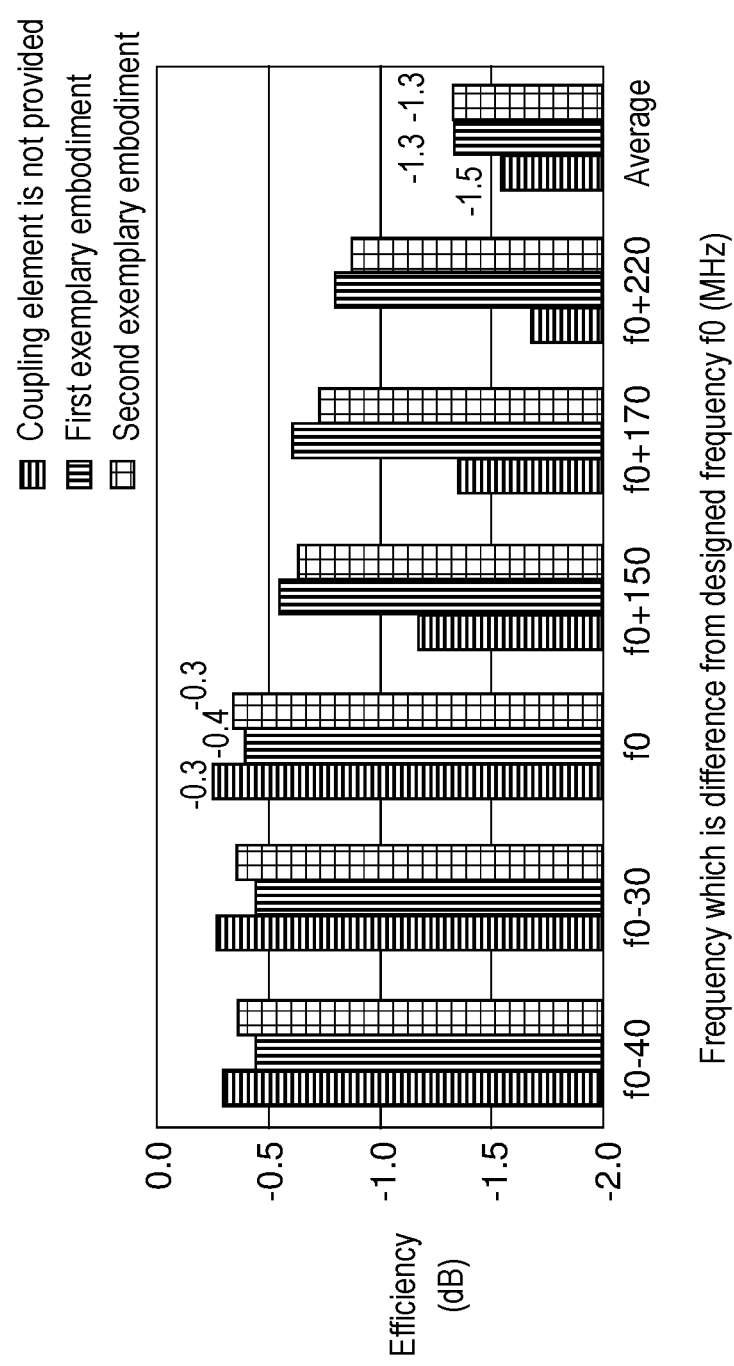
FIG. 9 is a bar graph illustrating a comparison in efficiency based on the number of coupling elements in the second exemplary embodiment of the mobile communication terminal according to the present disclosure.

FIG. 9 is a bar graph illustrating efficiency (dB) measured under the condition same as that in FIG. 8. It is understood from this graph that there is no particular change in the efficiency according to the number of the coupling elements.

<Change in Maximum Radiation Direction>

Next, examples of changing the maximum radiation direction in the second exemplary embodiment will be described.

(2-1) First Example

In the first example, the maximum radiation direction is changed by changing distance D. The maximum radiation direction can be changed by changing distance D between first coupling element 21a and second coupling element 21b. For example, when distance D is changed to 3λ/4 from λ/4, and second coupling element 21b is moved in the +X axis direction, the maximum radiation direction on the X-Z plane is changed to +20° from −20°, so that the directivity is tilted in the +X axis direction. Further, when distance D is changed to 0.7λ from 0.5λ, and second coupling element 21b is moved in the +X axis direction, the maximum radiation direction on the X-Z plane is changed to +15° from 0°, so that the directivity is tilted in the +X axis direction. Specifically, when second coupling element 21b is moved in the +X axis direction, the directivity is also tilted in the +X axis direction.

(2-2) Second Example

Figure 10:
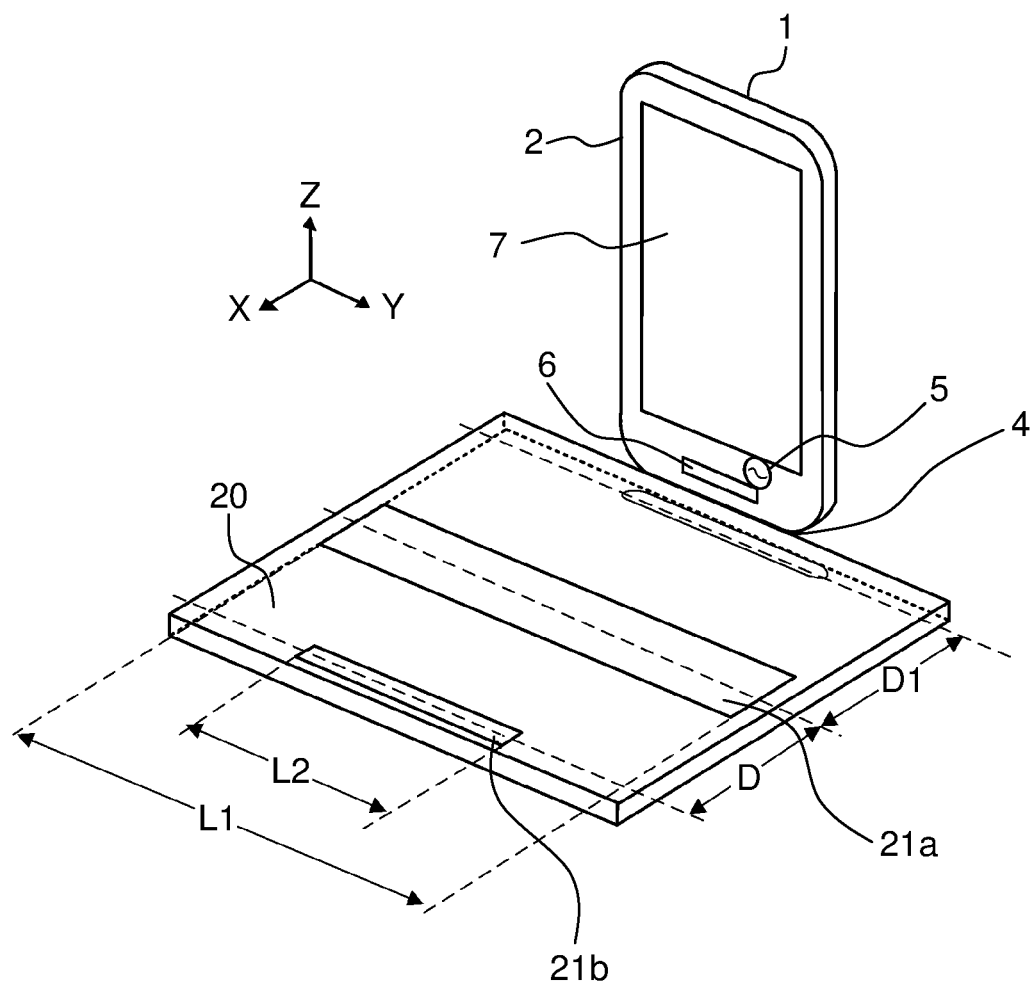
FIG. 10 is a front perspective view illustrating a second example in changing a maximum radiation direction in the second exemplary embodiment of the mobile communication terminal according to the present disclosure.

In the second example, the maximum radiation direction is changed by changing the relative distance between antenna element 6 and first coupling element 21a. FIG. 10 is a front perspective view illustrating the second example in changing the maximum radiation direction in the second exemplary embodiment of the mobile communication terminal according to the present disclosure. In FIG. 10, antenna element 6 of mobile communication terminal 1 is moved along the X axis direction to be located at one end of plate-like member 20, that is, on the end face opposite to second coupling element 21b, and the lengths of first coupling element 21a and second coupling element 21b and the space therebetween are the same as in the first example. Distance D1 between antenna element 6 and first coupling element 21a is λ/2 which is the same as distance D (D1=D=λ/2), and plate-like member 20 including first coupling element 21a and second coupling element 21b is moved by λ/2 in the +X axis direction. In this case, the maximum radiation direction on the X-Z plane is changed to +25° from 0°, so that the directivity is tilted in the +X axis direction which is the direction of movement of first coupling element 21a as in the first example. The maximum radiation direction (directivity) can be changed by changing the relative distance between antenna element 6 and first coupling element 21a in the X axis direction.

(2-3) Third Example

Figure 11A:
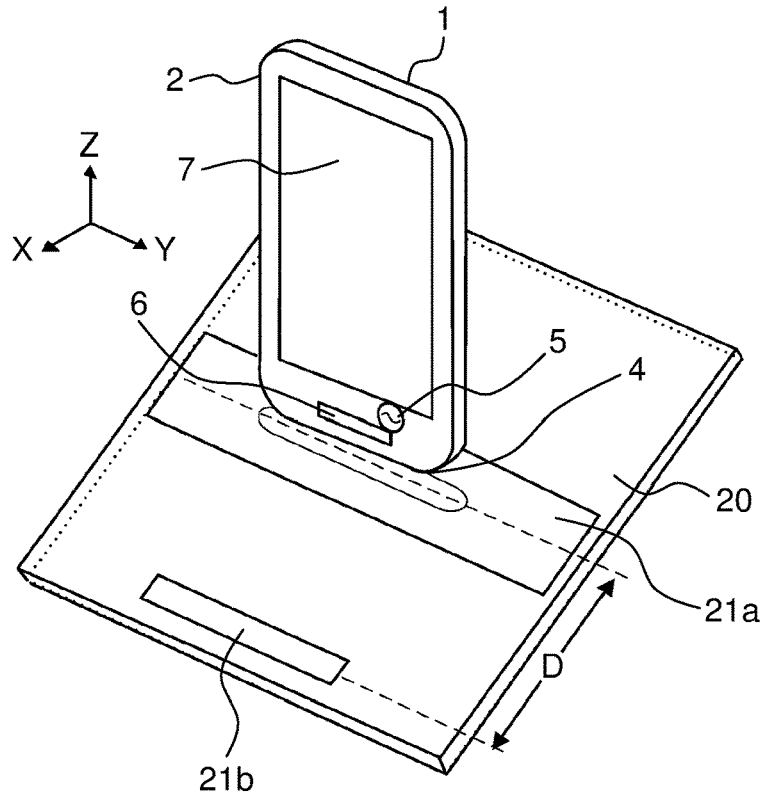
FIG. 11A is a front perspective view illustrating a third example in changing a maximum radiation direction in the second exemplary embodiment of the mobile communication terminal according to the present disclosure.
Figure 11B:
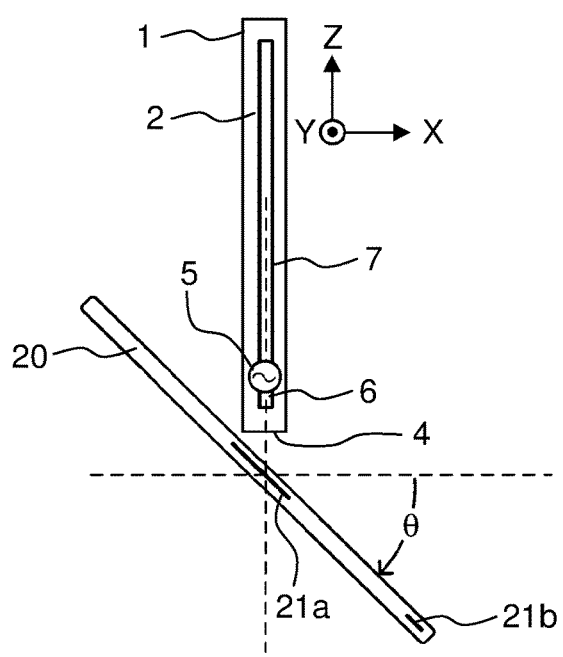
FIG. 11B is a left side view illustrating the third example in changing a maximum radiation direction in the second exemplary embodiment of the mobile communication terminal according to the present disclosure.

In the third example, the maximum radiation direction is changed by tilting plate-like member 20. FIG. 11A is a front perspective view illustrating the third example in changing the maximum radiation direction in the second exemplary embodiment of the mobile communication terminal according to the present disclosure, and FIG. 11B is a left side view. In FIGS. 11A and 11B, plate-like member 20 is tilted toward the −Z axis direction at angle θ about the Y axis. Since a planar part of plate-like member 20 and a planar part of second coupling element 21b are disposed to be parallel to each other, second coupling element 21b is similarly tilted at angle θ. That is, plate-like member 20 is tilted in the direction in which second coupling element 21b is away from antenna element 6. The other sizes are the same as those in the first example. The maximum radiation direction can be changed by changing angle θ. For example, when angle θ is changed to 45° from 0°, the maximum radiation direction on the X-Z plane is changed to 35° from 0°, so that the directivity is tilted in the +X axis direction. However, even when angle θ is set to be 50°, the maximum radiation direction is unchanged and keeps at 35°. Specifically, the directivity can be directed in the direction substantially orthogonal to the planar parts of plate-like member 20 and second coupling element 21b, although up to a predetermined angle.

As described above, in the second exemplary embodiment, first coupling element 21a is provided near antenna element 6 stored in case 2, and second coupling element 21b is provided on the X axis with a predetermined space from first coupling element 21a. With this configuration, antenna element 6 and first and second coupling elements 21a and 21b are capacitively coupled, so that a directivity gain is improved. Further, when the space between antenna element 6 and first coupling element 21a or the tilt of second coupling element 21b is changed, the maximum radiation direction can be changed to tilt the directivity. Thus, a desired satellite can be captured, as necessary, by changing the position of first coupling element 21a or second coupling element 21b according to an elevation angle at which the desired satellite is present, for example.

Third Exemplary Embodiment

Figure 12A:
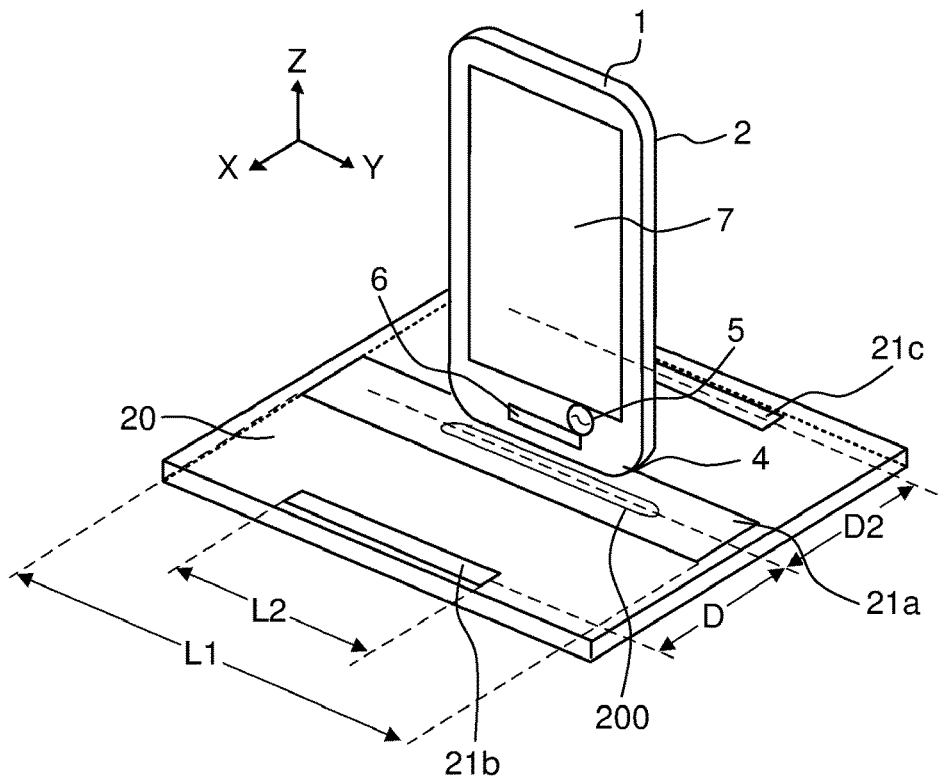
FIG. 12A is a front perspective view illustrating one example of a third exemplary embodiment of the mobile communication terminal according to the present disclosure.
Figure 12B:
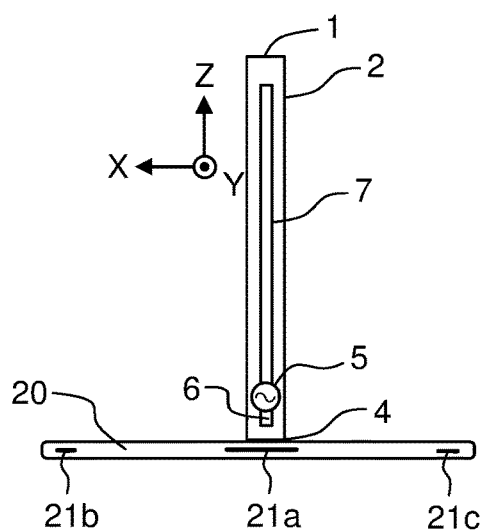
FIG. 12B is a right side view illustrating one example of the third exemplary embodiment of the mobile communication terminal according to the present disclosure.
Figure 12C:
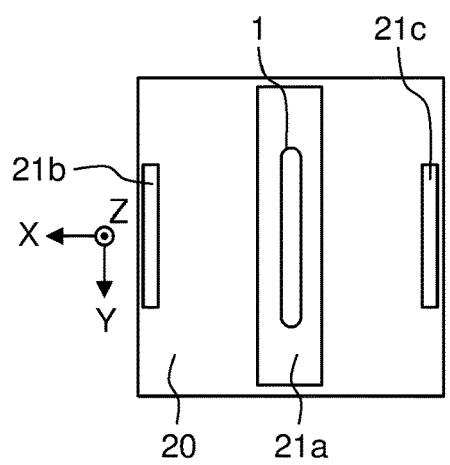
FIG. 12C is a top view illustrating one example of the third exemplary embodiment of the mobile communication terminal according to the present disclosure.

FIGS. 12A to 15B illustrate one example of a third exemplary embodiment of the mobile communication terminal according to the present disclosure, wherein FIG. 12A is a front perspective view, FIG. 12B is a right side view, and FIG. 12C is a top view.

Compared to the second exemplary embodiment, the third exemplary embodiment further includes third coupling element 21c. Third coupling element 21c is disposed near the rear end face of plate-like member 20, and separated from first coupling element 21a in the X axis direction with distance D2 which is a predetermined space. In the present exemplary embodiment, distance D2 is equal to distance D (D2=D). Similar to first coupling element 21a, third coupling element 21c is also long (linear) and extends along the Y axis direction.

FIG. 13 is a bar graph illustrating a comparison in a directivity gain of a clockwise circularly polarized wave based on the number of the coupling elements and distance D. A frequency is the designed frequency f0 (MHz). Distance D is set to be 0.25λ and 0.5λ. A vertical axis indicates a clockwise circularly polarized wave gain (dBiC), and a horizontal axis indicates a number of coupling elements. It is understood that, by providing second coupling element 21b and third coupling element 21c at both sides of first coupling element 21a, the directivity gain is improved, compared to the first exemplary embodiment and the second exemplary embodiment, even if distance D (=D1=D2) between each element is changed.

<Change in Maximum Radiation Direction>

Next, examples of changing the maximum radiation direction in the third exemplary embodiment will be described with reference to FIGS. 14A to 15B.

(3-1) First Example

Figure 14A:
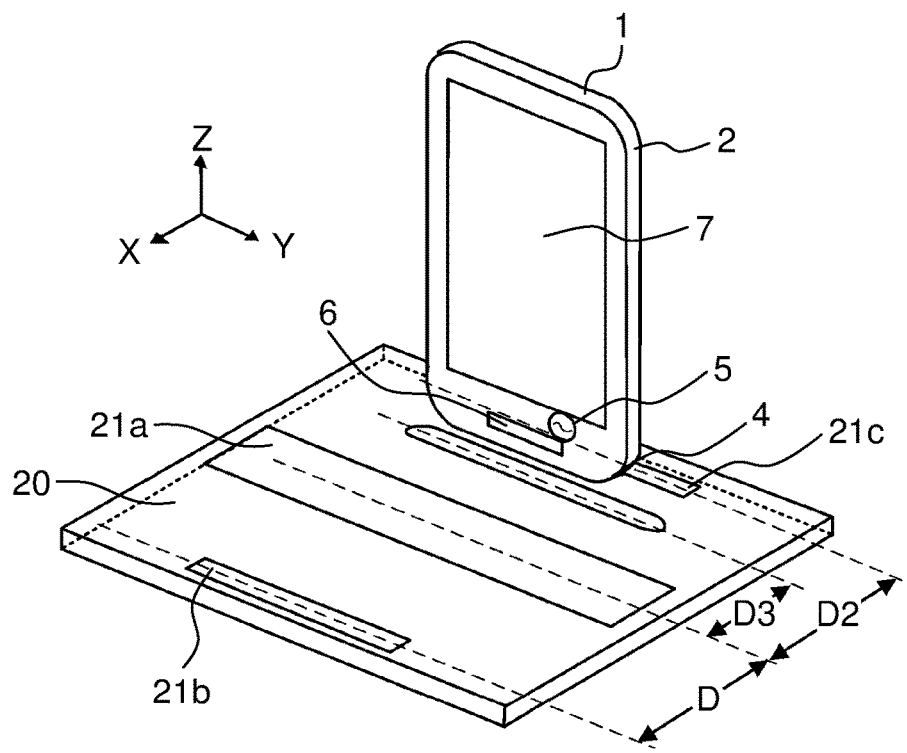
FIG. 14A is a front perspective view illustrating a first example in changing a maximum radiation direction in the third exemplary embodiment of the mobile communication terminal according to the present disclosure.
Figure 14B:
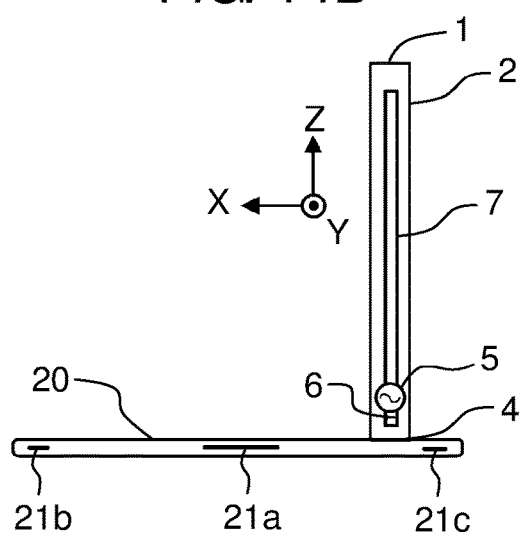
FIG. 14B is a right side view illustrating the first example in changing a maximum radiation direction in the third exemplary embodiment of the mobile communication terminal according to the present disclosure.
Figure 14C:
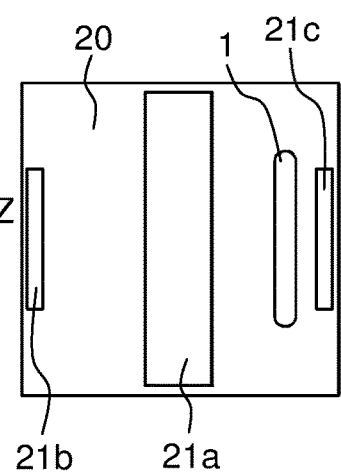
FIG. 14C is a top view illustrating the first example in changing a maximum radiation direction in the third exemplary embodiment of the mobile communication terminal according to the present disclosure.

In the first example, the maximum radiation direction is changed by changing the relative distance between antenna element 6 and first coupling element 21a. FIG. 14A is a front perspective view illustrating the first example in changing the maximum radiation direction in the third exemplary embodiment of the mobile communication terminal according to the present disclosure, FIG. 14B is a right side view, and FIG. 14C is a top view. In FIGS. 14A, 14B, and 14C, antenna element 6 of mobile communication terminal 1 is moved along the X axis direction toward third coupling element 21c. Distance D3 between antenna element 6 and first coupling element 21a is 0.27λ (D3=0.27λ), for example. Specifically, first coupling element 21a is moved in the +X axis direction by 0.27λ. In this case, the maximum radiation direction on the X-Z plane is changed to 20°, compared to 0° in D3=0, and the directivity is tilted in the +X axis direction. Further, when first coupling element 21a is moved in the −X axis direction in D3=0.27λ, the maximum radiation direction is changed to −10°, and the directivity is tilted in the −X axis direction. On the other hand, the maximum radiation directions when D1 is set to be 0.27λ and first coupling element 21a is moved in the +X axis direction and in the −X axis direction in the second exemplary embodiment are 15° and −5°, respectively. The maximum radiation direction (directivity) can be changed by changing the relative distance between antenna element 6 and first coupling element 21a in the X axis direction, and the maximum radiation direction can be more greatly changed than the first example in the second exemplary embodiment.

(3-2) Second Example

Figure 15A:
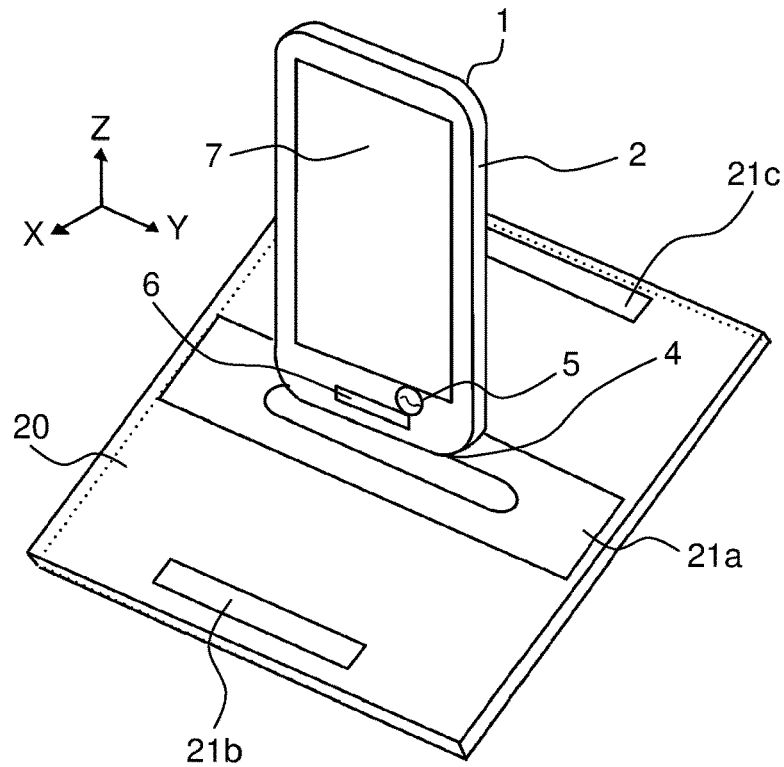
FIG. 15A is a front perspective view illustrating a second example in changing a maximum radiation direction in the third exemplary embodiment of the mobile communication terminal according to the present disclosure.
Figure 15B:
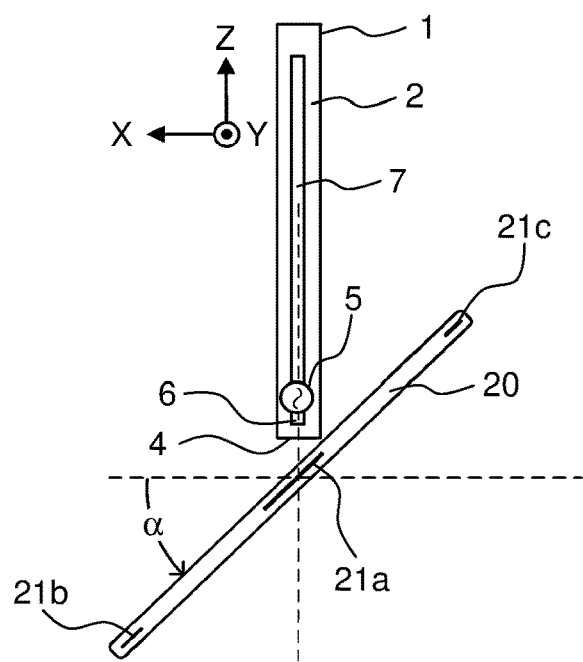
FIG. 15B is a right side view illustrating the second example in changing a maximum radiation direction in the third exemplary embodiment of the mobile communication terminal according to the present disclosure.

In the second example, the maximum radiation direction is changed by tilting plate-like member 20. FIG. 15A is a front perspective view illustrating the second example in changing the maximum radiation direction in the third exemplary embodiment of the mobile communication terminal according to the present disclosure, and FIG. 15B is a right side view. In FIGS. 15A and 15B, plate-like member 20 is tilted toward the −Z axis direction at angle α about the Y axis. That is, plate-like member 20 is tilted in the direction in which second coupling element 21b is away from antenna element 6. The maximum radiation direction can be changed by changing angle α. For example, in the case of α=45°, the maximum radiation direction on the X-Z plane becomes 40°, and the directivity is tilted in the +X axis direction. Compared to the maximum radiation direction of 35° in the third example in the second exemplary embodiment, the radiation direction can be greatly changed.

As described above, in the third exemplary embodiment, first coupling element 21a is provided near antenna element 6 stored in case 2, and second coupling element 21b and third coupling element 21c are provided in the X axis direction with a predetermined space from first coupling element 21a. With this configuration, antenna element 6 and first, second, and third coupling elements 21a, 21b, and 21c are capacitively coupled, so that a directivity gain is further improved. Further, when the space between antenna element 6 and first coupling element 21a or the tilt of second coupling element 21b is changed, the maximum radiation direction can be changed to tilt the directivity. Thus, a desired satellite can be captured, as necessary, by changing the position of first coupling element 21a or second coupling element 21b according to an elevation angle at which the desired satellite is present, for example.

Notably, examples of distances D, D1, D2, and D3, and tilts θ and α have been described above. However, the maximum radiation direction can be adjusted by combining these examples of distances D, D1, D2, and D3, and tilts θ and α, and they are appropriately set as necessary. For example, a desired satellite can be captured only by placing the end of mobile communication terminal 1 so as to be close to plate-like member 20 on which the coupling element having the optimized maximum radiation direction according to an elevation angle of the desired satellite is disposed.

Fourth Exemplary Embodiment

Figure 16:
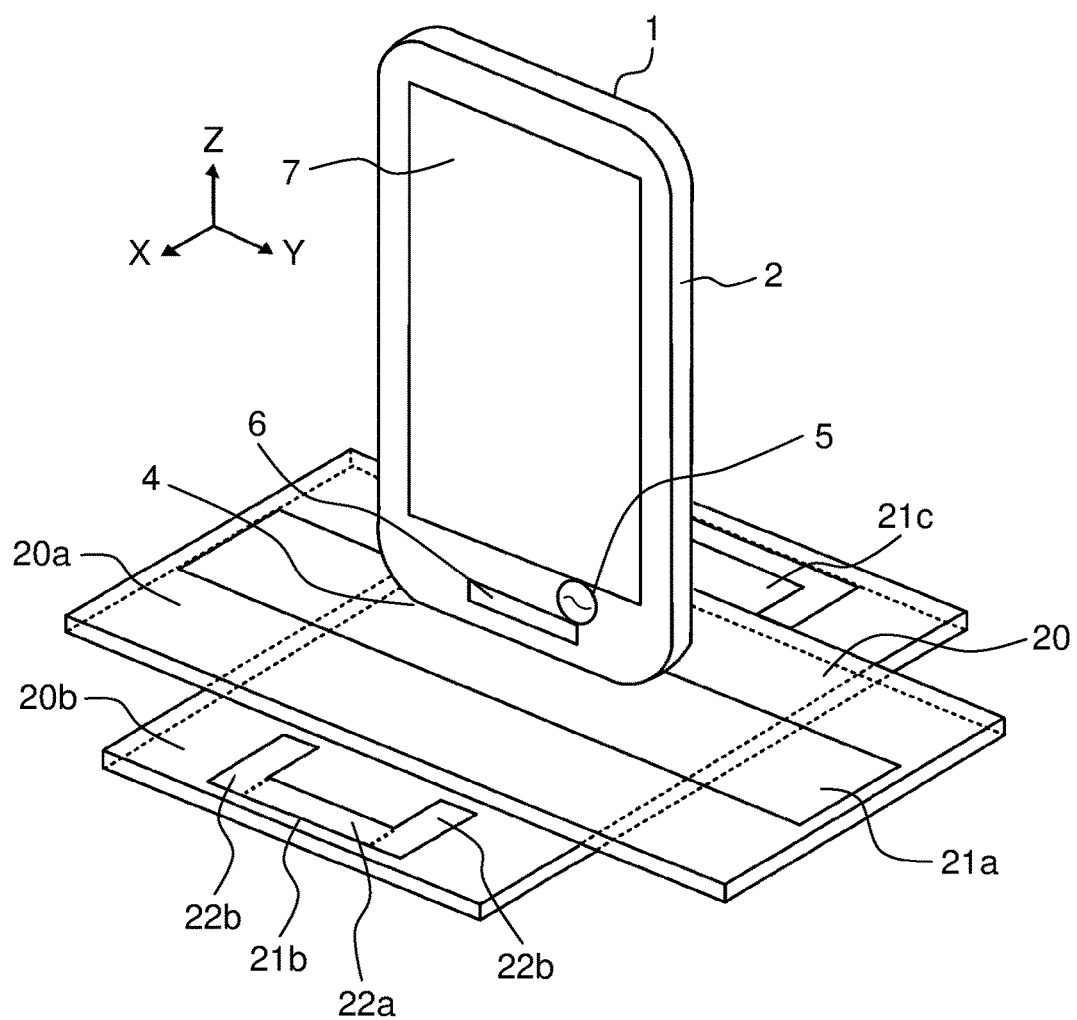
FIG. 16 is a front perspective view illustrating one example of a fourth exemplary embodiment of the mobile communication terminal according to the present disclosure.

FIG. 16 is a front perspective view illustrating one example of a fourth exemplary embodiment of the mobile communication terminal according to the present disclosure.

The fourth exemplary embodiment includes two plate-like members 20a and 20b. First coupling element 21a is stored in plate-like member 20a, and second coupling element 21b and third coupling element 21c are stored in the other plate-like member 20b. Further, each of second coupling element 21b and third coupling element 21c has substantially a U shape in which both ends extend toward first coupling element 21a. Specifically, each of second coupling element 21b and third coupling element 21c has linear body part 22a and bent parts 22b bent at about 90 degrees at both ends of body part 22a. Plate-like member 20 can be downsized due to the U shape.

Fifth Exemplary Embodiment

Figure 17:
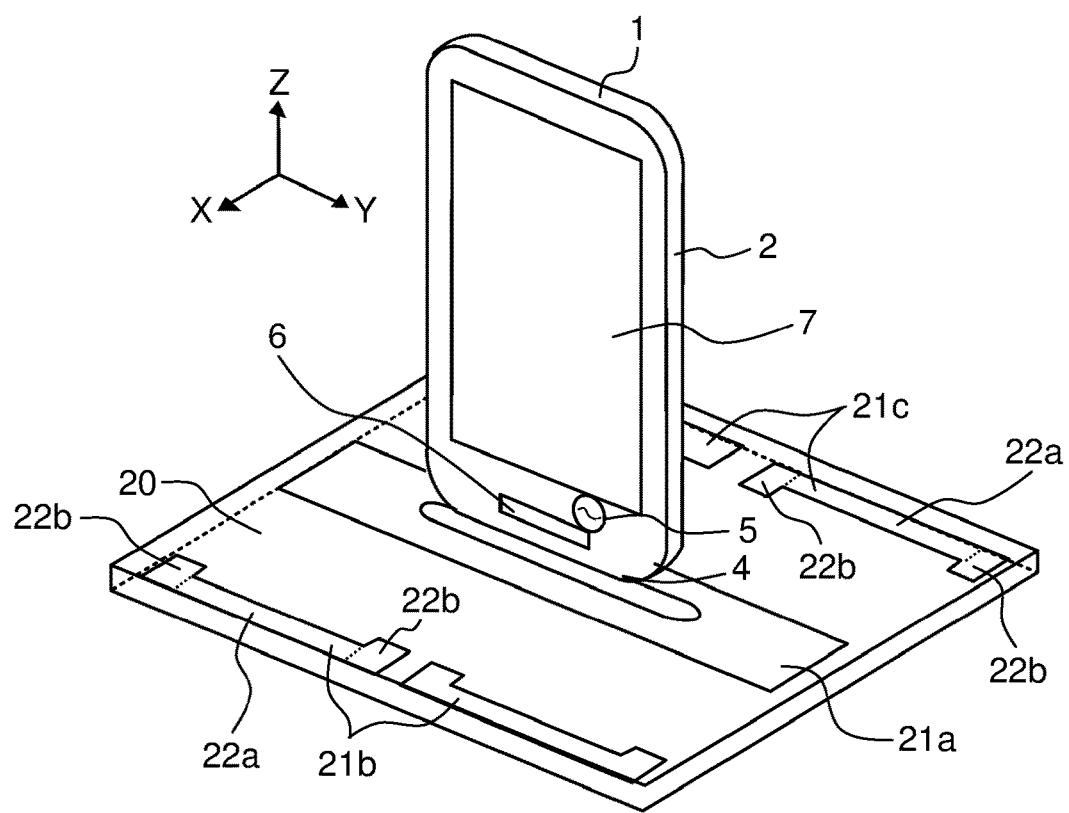
FIG. 17 is a front perspective view illustrating one example of a fifth exemplary embodiment of the mobile communication terminal according to the present disclosure.

FIG. 17 is a front perspective view illustrating one example of a fifth exemplary embodiment of the mobile communication terminal according to the present disclosure.

The fifth exemplary embodiment is a modification of the fourth exemplary embodiment. Two second coupling elements 21b and two third coupling elements 21c are provided, and respectively make a pair along the Y axis direction. Further, each of second coupling elements 21b and third coupling elements 21c has substantially a U shape in which both ends extend toward first coupling element 21a, and has linear body part 22a and bent parts 22b bent at about 90 degrees at both ends of body part 22a. With this arrangement, the directivity gain can be improved. It should be noted that, while it has been described above that two second coupling elements 21b and two third coupling elements 21c are provided, the number of the coupling elements is not limited thereto.

Sixth Exemplary Embodiment

Figure 18A:
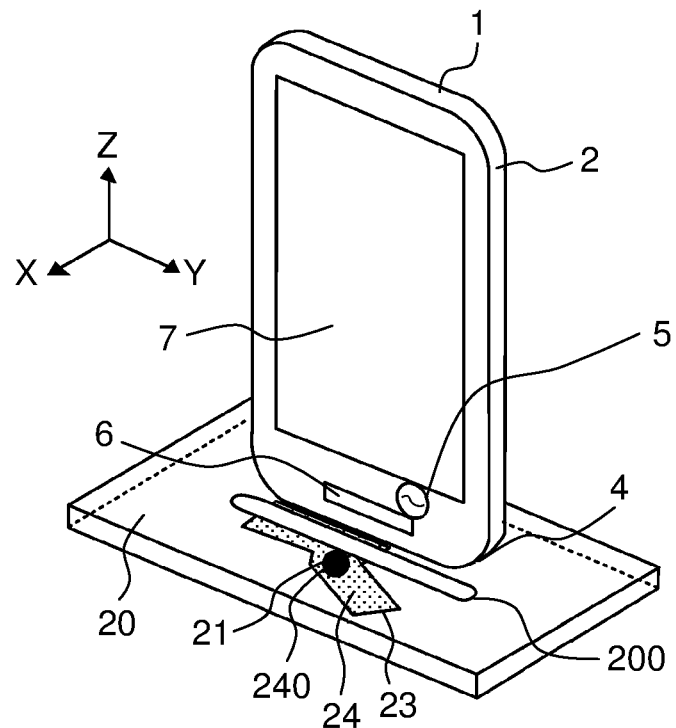
FIG. 18A is a front perspective view illustrating a first example of a sixth exemplary embodiment of the mobile communication terminal according to the present disclosure.

FIGS. 18A to 20 illustrate one example of a sixth exemplary embodiment of the mobile communication terminal according to the present disclosure. FIG. 18A is a front perspective view of a first example, FIG. 18B is a top view of the first example, FIG. 19A is a front perspective view of a second example, and FIG. 19B is a top view.

(6-1) First Example

Figure 18B:
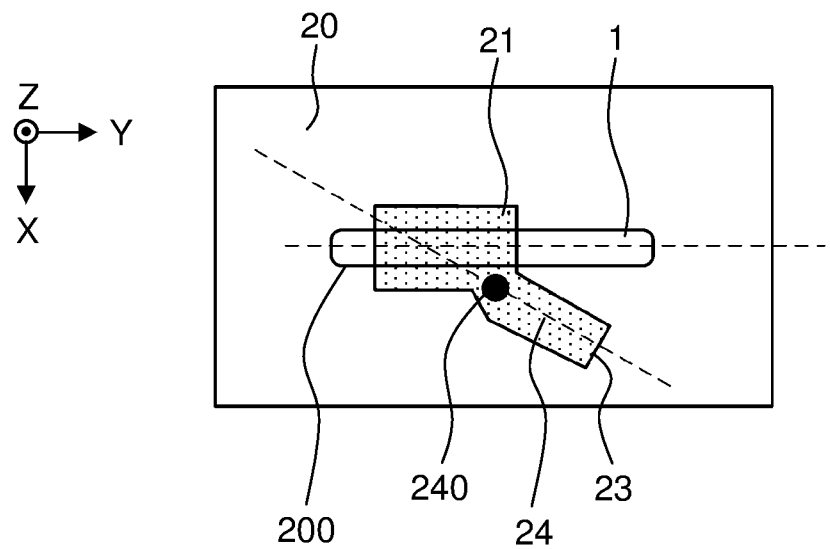
FIG. 18B is a top view illustrating the first example of the sixth exemplary embodiment of the mobile communication terminal according to the present disclosure.

In FIGS. 18A and 18B, coupling element 21 includes tilt part 24 having one end away from the Y axis and terminal end 23 which is open, different from the above-described linear type along the Y axis (for example, the first exemplary embodiment). Specifically, tilt part 24 has a positional relation such that, when antenna element 6 is disposed near coupling element 21, the extended line in the extending direction of tilt part 24 obliquely crosses the longitudinal direction (Y axis direction) of antenna element 6 in a plan view. When a crossing point between tilt part 24 and a portion of coupling element 21 extended in the Y axis direction is specified as starting point 24o, starting point 24o is located on approximately the same position as the center of antenna element 6 in the Y axis direction, and slightly shifted in the X axis direction. Further, the shape of coupling element 21 is not symmetric with respect to a point.

(6-2) Second Example

Figure 19A:
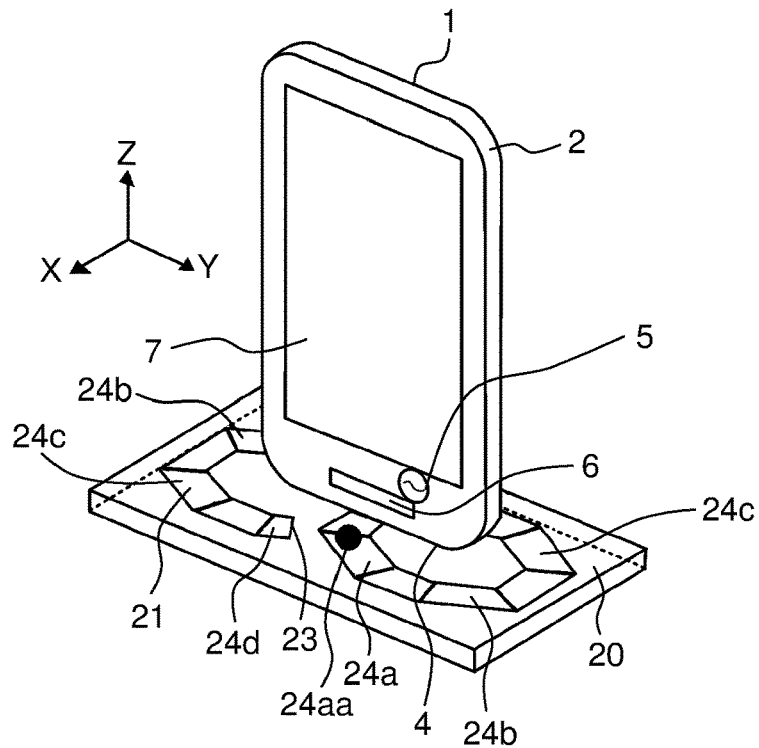
FIG. 19A is a front perspective view illustrating a second example of the sixth exemplary embodiment of the mobile communication terminal according to the present disclosure.
Figure 19B:
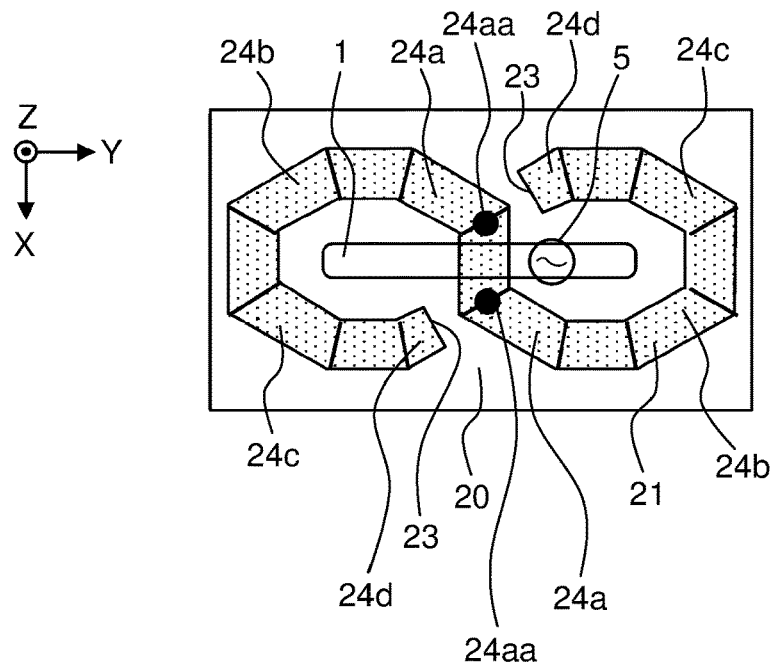
FIG. 19B is a top view illustrating the second example of the sixth exemplary embodiment of the mobile communication terminal according to the present disclosure.

Tilt part 24 of coupling element 21 in the first example is provided on one end in the above description. However, it may be provided on both sides. In the second example, as illustrated in FIGS. 19A and 19B, tilt parts 24a, 24b, 24c, and 24d and portions extended in the X axis direction and Y axis direction are continuously connected so as to form a symmetric shape with respect to a point which is the center of coupling element 21 specified as a starting point, and connected around so as to draw a circular arc. Thus, they are connected to form an approximately reversed S shape viewed from top, and terminal ends 23 are open ends. In addition, the crossing point between tilt part 24a closest to the center of coupling element 21 and a portion which is a part of coupling element 21 and extended in the same direction as the X axis direction or the Y axis direction is specified as starting point 24aa. Starting point 24aa is located on substantially the same position of mobile communication terminal 1, and near the center position of coupling element 21, but is away from the center position of antenna element 6 by 0.084λ.

FIG. 20 is a bar graph illustrating a comparison in a directivity gain of a clockwise circularly polarized wave, a counterclockwise circularly polarized wave, and a linearly polarized wave based on the shape of the coupling element. A vertical axis indicates a directivity gain (the unit of a circularly polarized wave is dBiC and the unit of a linearly polarized wave is dBi) of each polarized wave, and a horizontal axis indicates a shape of a coupling element, that is, the case of using no coupling element, the case of using a linear coupling element according to the first exemplary embodiment, the case of using the coupling element according to the first example of the sixth exemplary embodiment, and the case of using the coupling element according to the second example of the sixth exemplary embodiment.

It is understood from the graph that the gain is almost the same for the clockwise circularly polarized wave and the counterclockwise circularly polarized wave in the case of using no coupling element and in the case of using the linear coupling element (first exemplary embodiment), which shows that a linearly polarized wave is radiated. Considering the change in the gain from the case of using the linear coupling element (first exemplary embodiment) to the case of using the coupling element according to the first example of the sixth exemplary embodiment, the linearly polarized wave gain is deteriorated to 5.7 dBi from 6.6 dBi, which shows the deterioration by 0.9 dB. However, the clockwise circularly polarized wave gain is changed to 3.8 dBiC from 3.7 dBiC, which shows that almost the same gain is obtained. This is because not the linearly polarized wave but the clockwise circularly (elliptic) polarized wave is radiated, since the counterclockwise circularly polarized wave gain is reduced by 1.6 dB from 3.5 dBiC to 1.9 dBiC, and the clockwise circularly polarized wave gain in the first example of the sixth exemplary embodiment is higher than the counterclockwise circularly polarized wave gain by 1.9 dB. Next, from the change in the gain from the case of the first example to the case of the second example, the linearly polarized wave gain is improved by 0.8 dB, and the clockwise circularly polarized wave gain is improved by 2.2 dB which is larger than the improvement amount of the linearly polarized wave. This shows that, since the counterclockwise circularly polarized wave gain is reduced by 0.6 dB, and the clockwise circularly polarized wave gain in the case of the second example is higher than the counterclockwise circularly polarized wave gain by 4.7 dB, the clockwise circularly (elliptic) polarized wave whose axial ratio is further improved is radiated. A clockwise circularly polarized wave is often used in satellite communication such as a satellite broadcasting or GPS. Use of the sixth exemplary embodiment enables a circularly polarized wave to be radiated to further improve the gain of a clockwise circularly polarized wave in the zenith direction, and thus, this is preferable for communication with a satellite.

Notably, in the present exemplary embodiment, an element has a point symmetric shape with respect to the center of mobile communication terminal 1 in a plan view. However, a point symmetric shape with respect to the center of antenna element 6 is preferable, and with this, an axial ratio can be improved. Specifically, starting point 24aa of tilt part 24a is desirably located near the center of antenna element 6. In addition, the angle made by the extended line of tilt part 24 and the extended line of antenna element 6 is not particularly limited, and may be about 90°, so long as an approximately S shape or an approximately reversed S shape can be formed.

Seventh Exemplary Embodiment

Figure 21A:
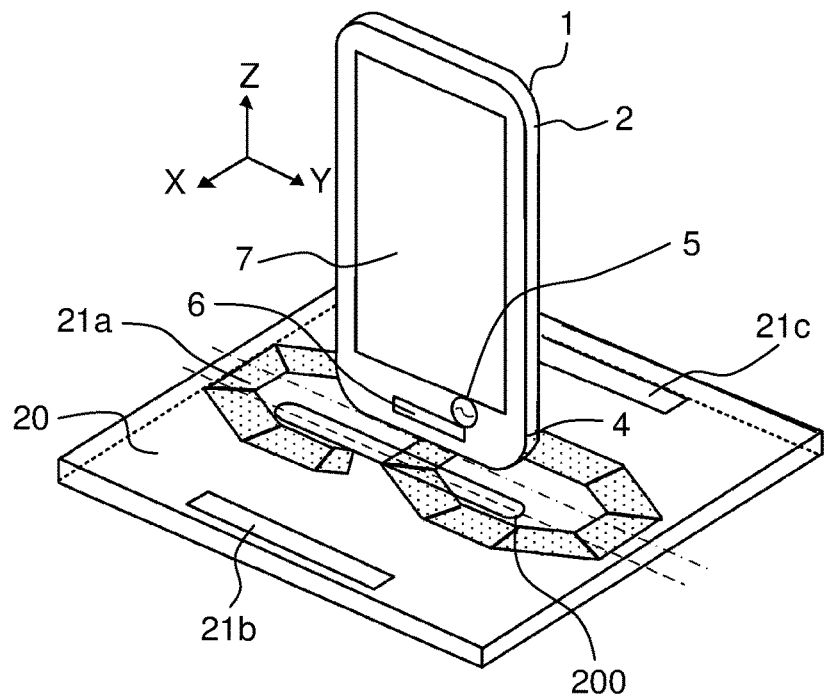
FIG. 21A is a front perspective view illustrating a first example of a seventh exemplary embodiment of the mobile communication terminal according to the present disclosure.

FIGS. 21A to 23 illustrate one example of a seventh exemplary embodiment of the mobile communication terminal according to the present disclosure. FIG. 21A is a front perspective view of a first example, FIG. 21B is a top view as viewed from the +Z axis direction, FIG. 22A is a front perspective view of a second example, and FIG. 22B is a top view as viewed from the +Z axis direction.

(7-1) First Example

Figure 21B:
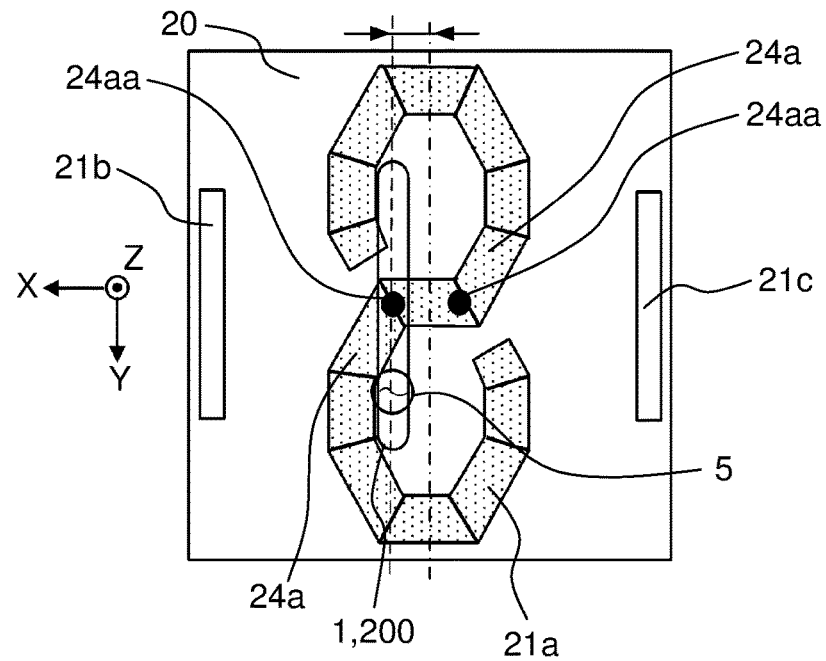
FIG. 21B is a top view illustrating the first example of the seventh exemplary embodiment of the mobile communication terminal according to the present disclosure.

In the first example, as illustrated in FIGS. 21A and 21B, first coupling element 21a has an approximately reversed S shape in a plan view from the +Z axis direction, and second coupling element 21b and third coupling element 21c are provided on both sides of first coupling element 21a in the +X axis direction and in the −X axis direction, respectively. Mobile communication terminal 1 is located on the position close to second coupling element 21b, that is, in the +X axis direction from the center of first coupling element 21a, and one of starting points 24aa of tilt part 24a and the positions of feeding point 5 and antenna element 6 on the X axis are substantially the same, so that they are close to one another.

(7-2) Second Example

Figure 22A:
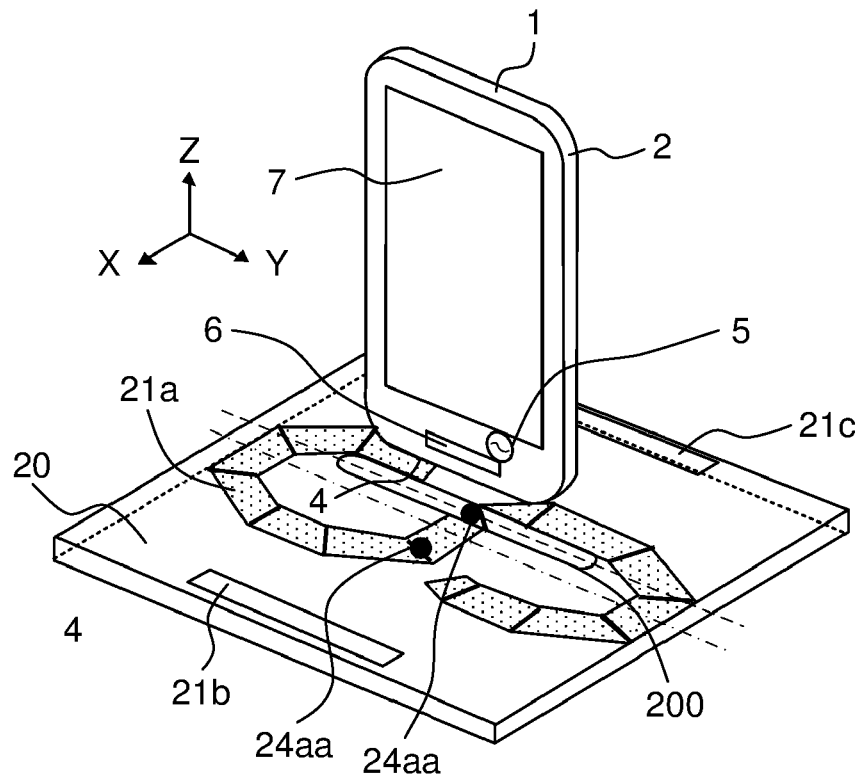
FIG. 22A is a front perspective view illustrating a second example of the seventh exemplary embodiment of the mobile communication terminal according to the present disclosure.
Figure 22B:
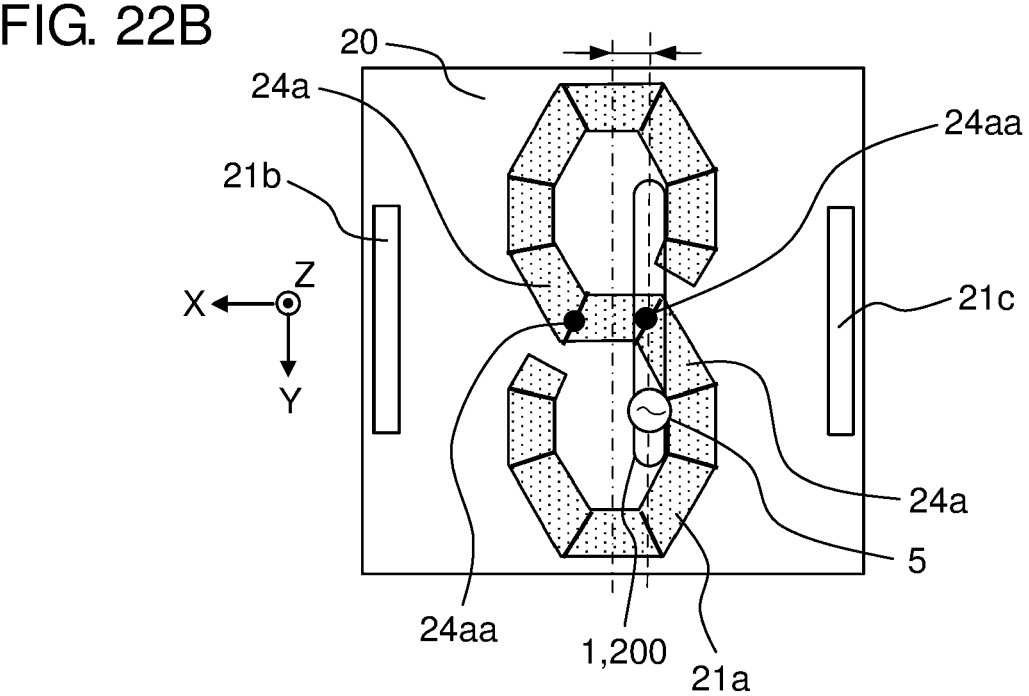
FIG. 22B is a top view illustrating the second example of the seventh exemplary embodiment of the mobile communication terminal according to the present disclosure.

In the second example, as illustrated in FIGS. 22A and 22B, first coupling element 21a has an approximately S shape viewed from top from the +Z axis direction, and second coupling element 21b and third coupling element 21c are provided on both sides of first coupling element 21a in the +X axis direction and in the −X axis direction, respectively. Mobile communication terminal 1 is located on the position close to third coupling element 21c with respect to the center of first coupling element 21a, and one of starting points 24aa of tilt part 24a and the positions of feeding point 5 and antenna element 6 on the X axis are substantially the same, so that they are close to one another.

Figure 23:
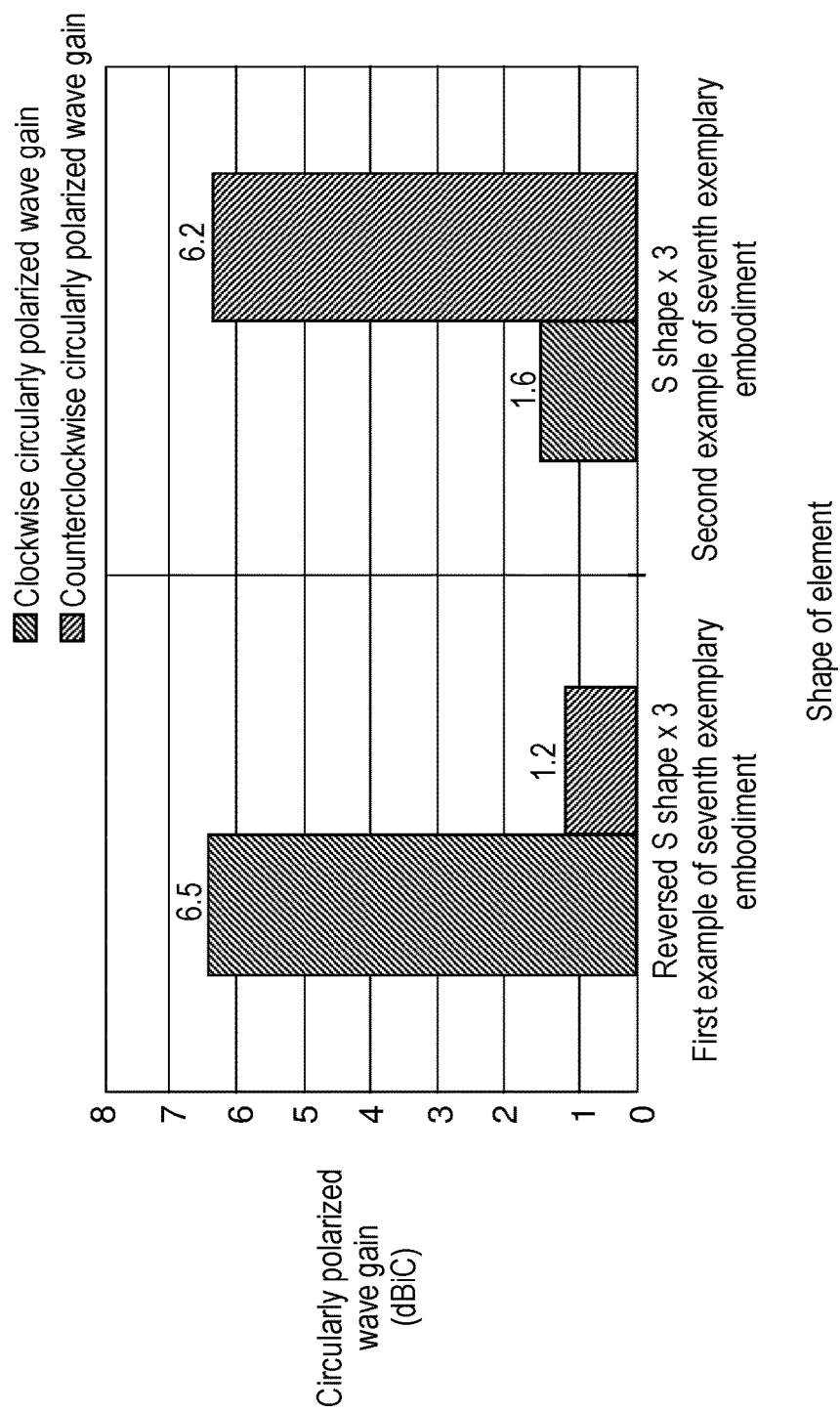
FIG. 23 is a bar graph illustrating a comparison in a directivity gain of a clockwise circularly polarized wave and a counterclockwise circularly polarized wave between the first example and the second example in the seventh exemplary embodiment of the mobile communication terminal according to the present disclosure.

FIG. 23 is a bar graph illustrating a comparison in a directivity gain of a clockwise circularly polarized wave and a counterclockwise circularly polarized wave between the first example and the second example in the seventh exemplary embodiment. A vertical axis indicates a circularly polarized wave gain (dBiC), and a horizontal axis indicates the first example and the second example.

It is understood from the graph that more clockwise circularly polarized wave is radiated in the first example, and more counterclockwise circularly polarized wave is radiated in the second example. The direction of the circularly polarized wave can be changed by turning first coupling element 21a 180 degrees about the X axis. In addition, with the configuration in which one of starting points 24aa of tilt part 24a and the center position of antenna element 6 are the same in the X axis direction according to a desired polarization plane, the axial ratio of a circularly polarized wave can be improved. That is, the clockwise circularly polarized wave gain can be enhanced in the first example, and the counterclockwise circularly polarized wave gain can be enhanced in the second example One example of some exemplary embodiments of mobile communication terminal 1 according to the present disclosure has been described above. Coupling element 21 having a length of about λ/2 or more with respect to communication wavelength λ is provided near antenna element 6 so as to be close to antenna element 6 with a predetermined distance in the −Z axis direction, and they are capacitively coupled to each other, so that radiation power in the +Z axis direction (in this case, the longitudinal direction of case 2, zenith direction) is increased by utilizing existing antenna element 6 with no cable connection without changing an antenna configuration at the end of existing mobile communication terminal 1. Thus, a directivity gain can be improved. In addition, wider bandwidth can be obtained, and efficiency can be improved. Due to the improvement in the directivity gain in the zenith direction, satellite communication with a satellite in the zenith direction is enabled, and utility value can be increased, if a terrestrial communication network is unable to be used in the event of a disaster.

2. Case Cover

Next, one example of exemplary embodiments of a case cover according to the present disclosure will be described with reference to FIGS. 24A to 28C.

First Exemplary Embodiment

Figure 24A:
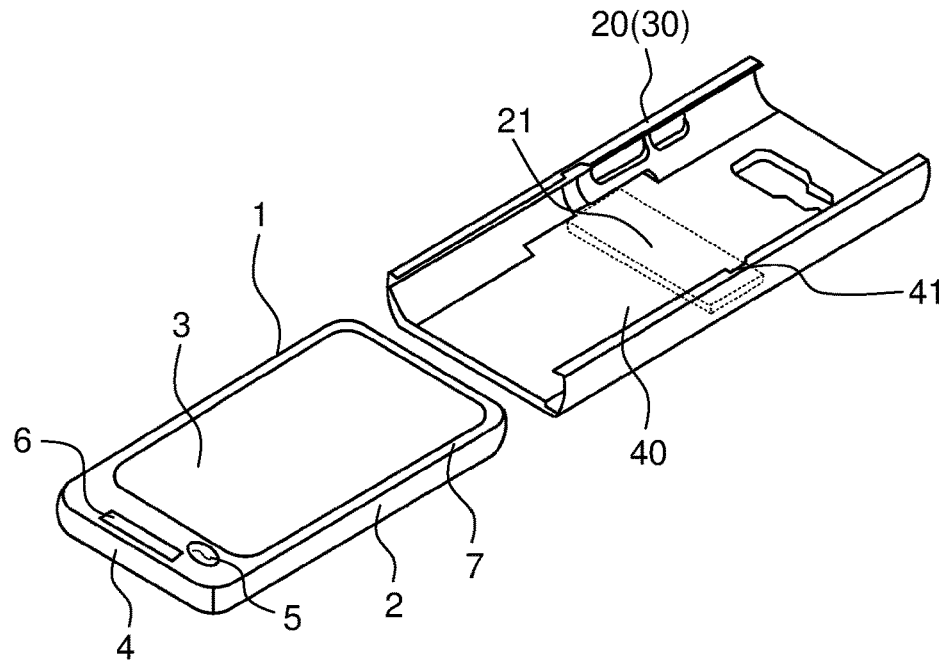
FIG. 24A is an exploded perspective view illustrating one example of a first exemplary embodiment of a case cover according to the present disclosure.
Figure 24B:
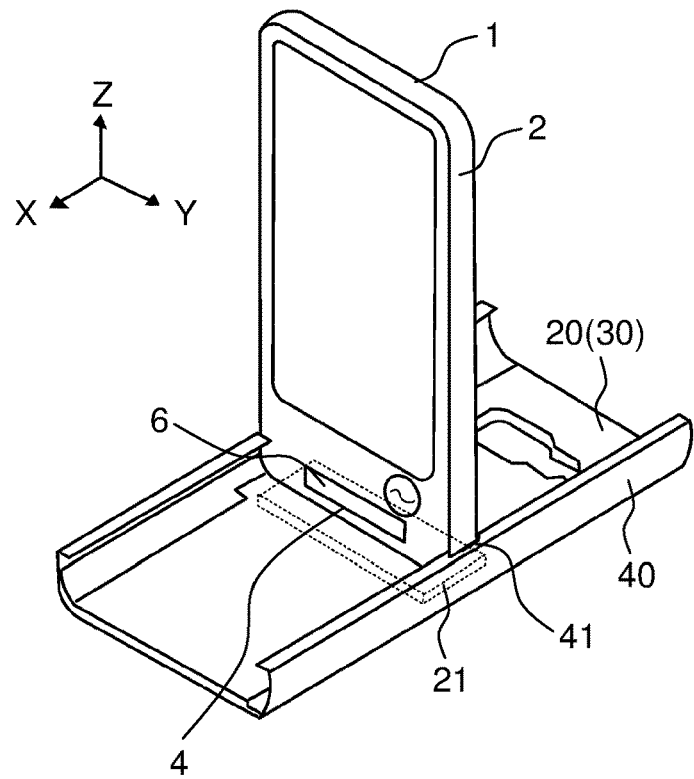
FIG. 24B is an assembly perspective view illustrating one example of the first exemplary embodiment of the case cover according to the present disclosure.

FIG. 24A is an exploded perspective view illustrating one example of a first exemplary embodiment of the case cover, and FIG. 24B is an assembly perspective view illustrating one example of the first exemplary embodiment of the case cover.

As illustrated in FIGS. 24A and 24B, case cover 30 is plate-like member 20 storing coupling element 21. Case cover 30 protects case 2 of mobile communication terminal 1 and covers both sides and the back surface of case 2. Case cover 30 is also a commercially available custom jacket carried by a user with case 2 being fitted thereto. Case cover 30 includes body part 40 that is directly attachable to case 2 of mobile communication terminal 1. When a user performs communication using case cover 30, he/she may remove case cover 30 from mobile communication terminal 1, and put end 4 of mobile communication terminal 1 into engagement part 41 formed on body part 40 by making end 4 of mobile communication terminal 1 close to body part 40 of case cover 30, as illustrated in FIG. 24B. That is, case cover 30 functions as a pedestal or a supporting platform of mobile communication terminal 1.

As in the first exemplary embodiment, coupling element 21 mounted to body part 40 is long with a length of about λ/2 or more with respect to communication wavelength λ. When one end 4 of case 2 of mobile communication terminal 1 is placed near coupling element 21, antenna element 6 and coupling element 21 can be capacitively coupled to each other.

Second Exemplary Embodiment

Figure 25:
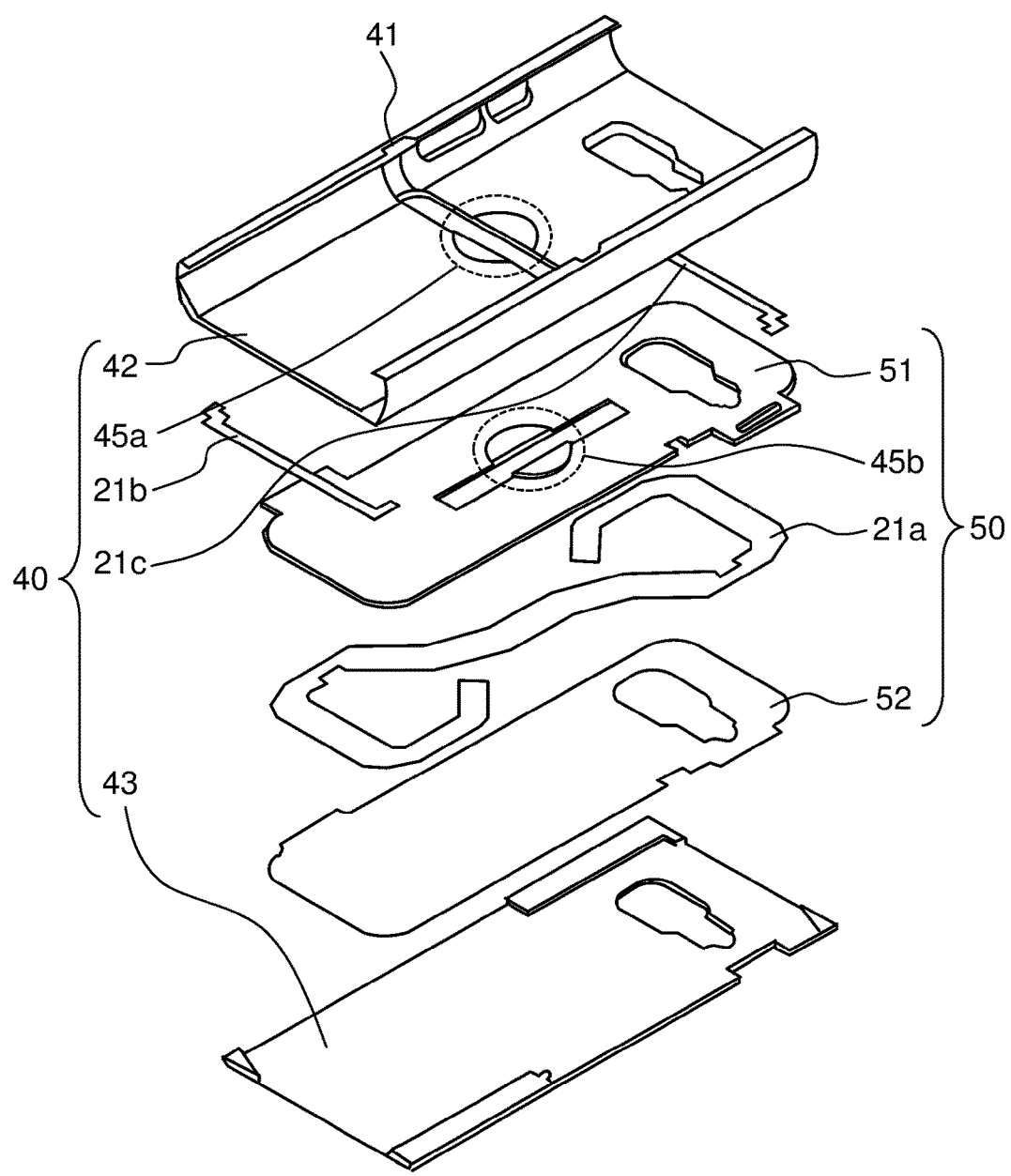
FIG. 25 is an exploded perspective view illustrating one example of a second exemplary embodiment of the case cover according to the present disclosure.
Figure 26A:
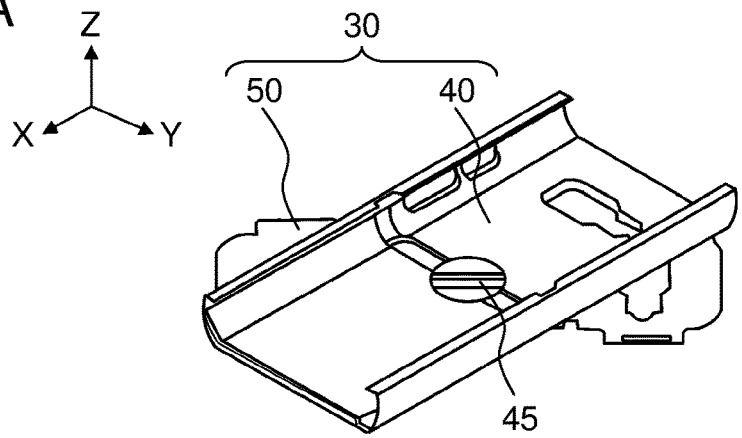
FIG. 26A is a perspective view illustrating one example of an assembly in the second exemplary embodiment of the case cover according to the present disclosure, wherein a mounting state of a body part and an antenna part is illustrated.
Figure 26B:
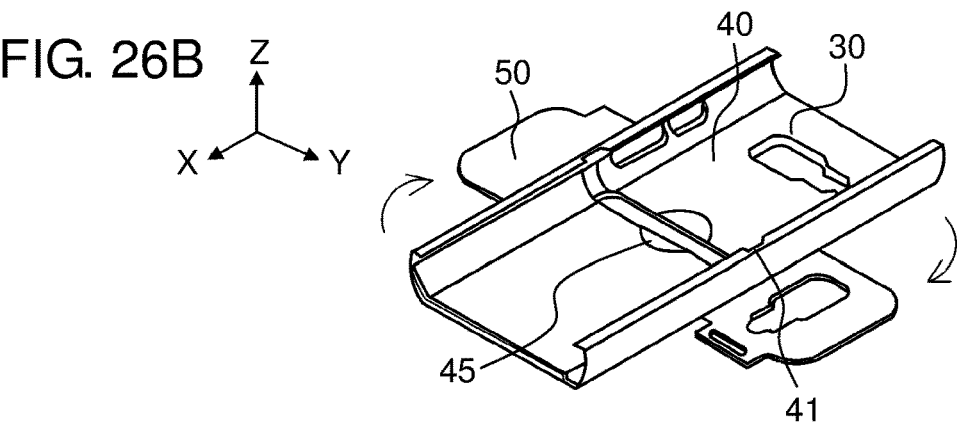
FIG. 26B is a perspective view illustrating one example of an assembly in the second exemplary embodiment of the case cover according to the present disclosure, wherein a state in which the antenna part is mounted to the body part is illustrated.
Figure 26C:
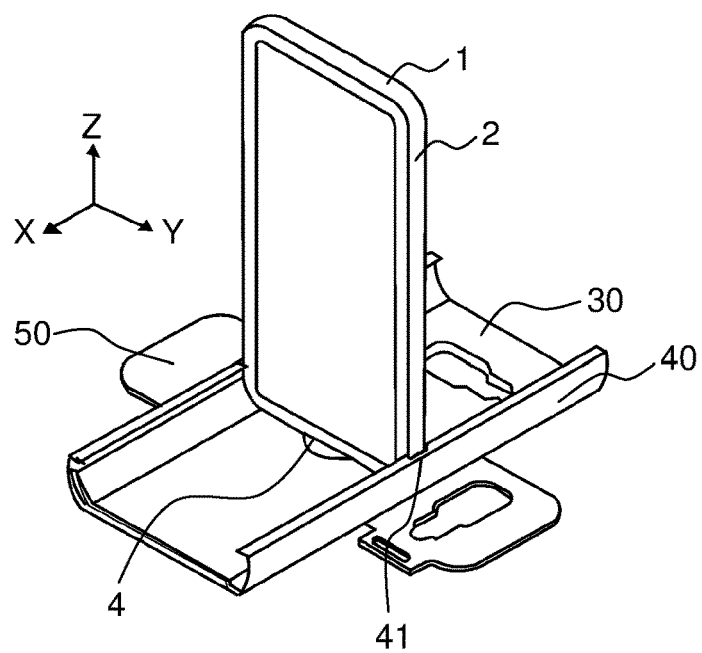
FIG. 26C is a perspective view illustrating one example of an assembly in the second exemplary embodiment of the case cover according to the present disclosure, wherein a state in which a mobile communication terminal is installed to the case cover is illustrated.

FIGS. 25, 26A, 26B, and 26C illustrate one example of a second exemplary embodiment of the case cover, wherein FIG. 25 is an exploded perspective view, FIG. 26A is a perspective view illustrating a mounting state of a body part and an antenna part, FIG. 26B is a perspective view illustrating the state in which the antenna part is mounted to the body part, and FIG. 26C is a perspective view illustrating the state in which the mobile communication terminal is installed to the case cover.

As illustrated in FIG. 25, body part 40 of case cover 30 includes base 42 that is directly joined to case 2, fixation part 43 that is joined to the back surface of base 42, second coupling element 21b and third coupling element 21c, which are disposed between base 42 and fixation part 43 and fixed to both ends of base 42 and fixation part 43 in the longitudinal direction, and rotation shaft part 45a. Antenna part 50 includes first flat plate part 51, second flat plate part 52, first coupling element 21a fixed between first flat plate part 51 and second flat plate part 52, and rotation shaft part 45b, wherein, in a space formed by base 42 and fixation part 43, rotation shaft part 45b is inserted into rotation shaft part 45a, so that antenna part 50 is stored so as to be turnable.

Body part 40 and antenna part 50 are assembled with the procedure described below.

As illustrated in FIGS. 26A and 26B, antenna part 50 is turned in a direction of an arrow at rotation part 45 of body part 40 in order that body part 40 and antenna part 50 are disposed to be relatively substantially orthogonal to each other. First coupling element 21a is extended and disposed on the Y axis, and second coupling element 21b and third coupling element 21c are disposed in the X axis direction with a predetermined space. Then, as illustrated in FIG. 26C, case 2 of mobile communication terminal 1 is set to substantially vertically stand on body part 40 and to be fitted to engagement part 41. With this, end 4 of case 2 is placed near first coupling element 21a, and the assembly of mobile communication terminal 1 and case cover 30 is completed. Thus, a high gain is obtained in the zenith direction (+Z axis direction), so that communication with a satellite can be started. In the present exemplary embodiment, second coupling element 21b and third coupling element 21c are provided on the same plane, and this plane is slightly shifted in the +Z axis direction, different from the plane on which first coupling element 21a is provided.

Third Exemplary Embodiment

Figure 28A:
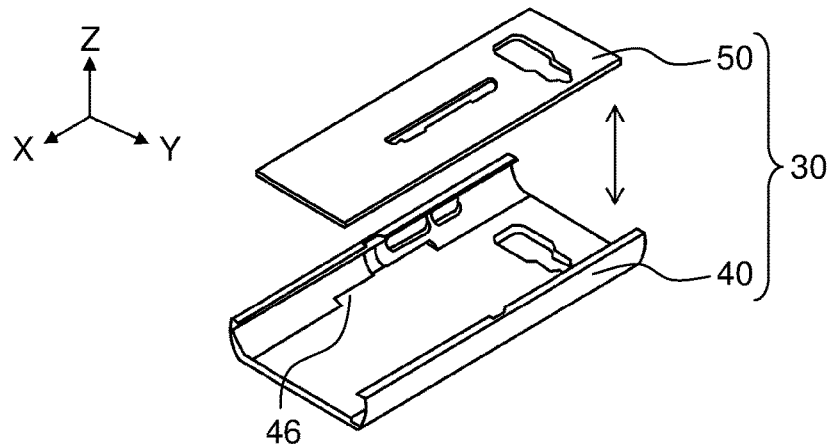
FIG. 28A is a perspective view illustrating one example of an assembly in the third exemplary embodiment of the case cover according to the present disclosure, wherein a mounting state of a body part and an antenna part is illustrated.
Figure 28B:
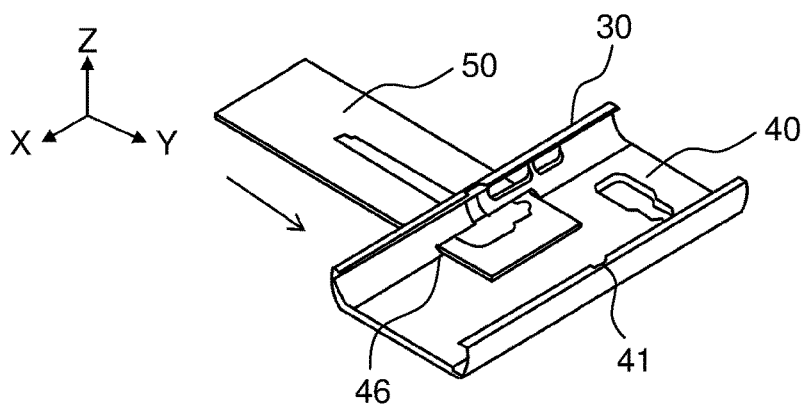
FIG. 28B is a perspective view illustrating one example of an assembly in the third exemplary embodiment of the case cover according to the present disclosure, wherein a state in which the antenna part is mounted to the body part is illustrated.
Figure 28C:
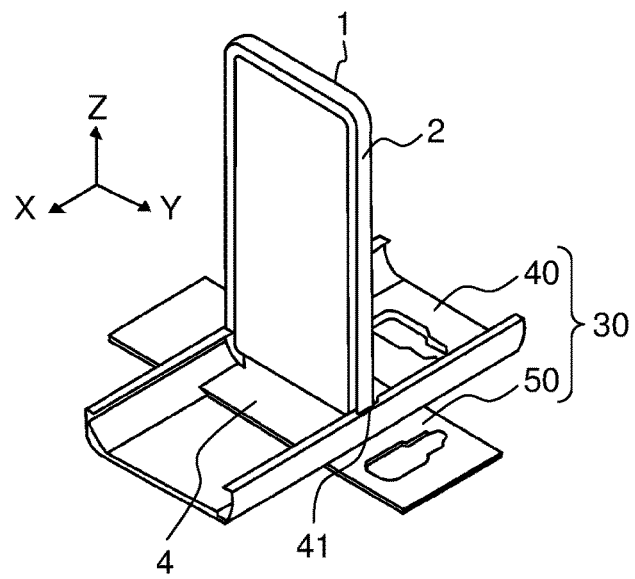
FIG. 28C is a perspective view illustrating one example of an assembly in the third exemplary embodiment of the case cover according to the present disclosure, wherein a state in which a mobile communication terminal is installed to the case cover is illustrated.

FIGS. 27, 28A, 28B, and 28C illustrate one example of a third exemplary embodiment of the case cover, wherein FIG. 27 is an exploded perspective view, FIG. 28A is a perspective view illustrating a mounting state of a body part and an antenna part, FIG. 28B is a perspective view illustrating the state in which the antenna part is mounted to the body part, and FIG. 28C is a perspective view illustrating the state in which the mobile communication terminal is installed to the case cover.

As illustrated in FIG. 27, body part 40 includes fixation parts 43a and 43b that are directly joined to a back surface of base 42a, and second coupling element 21b and third coupling element 21c, which are disposed between base 42a and fixation parts 43a and 43b and fixed to the vicinity of both ends in the longitudinal direction. Antenna part 50 includes first flat plate part 51, second flat plate part 52, and first coupling element 21a fixed between first flat plate part 51 and second flat plate part 52. As illustrated in FIG. 28A, antenna part 50 is detachably mounted to the inner surface of body part 40 of case cover 30.

Body part 40 and antenna part 50 are assembled with the procedure described below.

Antenna part 50 is removed from body part 40, and as illustrated in FIG. 28B, antenna part 50 is inserted into openings 46 formed on both sides of body part 40 in a direction of an arrow. Then, body part 40 and antenna part 50 are disposed so as to be relatively substantially orthogonal to each other. First coupling element 21a is extended and disposed on the Y axis, and second coupling element 21b and third coupling element 21c are disposed in the X axis direction with a predetermined space. Then, as illustrated in FIG. 28C, case 2 of mobile communication terminal 1 is set to substantially vertically stand on body part 40 and to be fitted to engagement part 41. With this, end 4 of case 2 is placed near first coupling element 21a, and the assembly of mobile communication terminal 1 and case cover 30 is completed. Thus, a high gain is obtained in the zenith direction (+Z axis direction), so that communication with a satellite can be started. In the present exemplary embodiment, second coupling element 21b and third coupling element 21c are provided on the same plane, and this plane is slightly shifted in the −Z axis direction, different from the plane on which first coupling element 21a is provided.

By using case cover 30 including first coupling element 21a, second coupling element 21b, and third coupling element 21c, satellite communication using a satellite is enabled as well as terrestrial communication through a base station of mobile communication terminal 1. Thus, a communication band can easily be extended, and portability can be enhanced. Further, a directivity gain is enhanced due to case cover 30.

Although case cover 30 and case 2 are separate members in the above description, coupling element 21 can be provided on case 2 or a battery cover not illustrated, for example, and case 2 or the battery cover can be removed for use. In this case, it may be construed that case 2 corresponds to a chassis or the like of mobile communication terminal 1, and case cover 30 corresponds to "case" which is generally recognized.

The present disclosure is not limited to the above-described exemplary embodiments, and variations, modifications, or the like may be made as necessary. In addition, materials, shapes, dimensions, numerical values, forms, number, placed positions, or the like of the respective constitutional elements in the above exemplary embodiments are arbitrary and are not limited thereto, if they can achieve the present disclosure.

The mobile communication terminal and the case cover according to the present disclosure are applicable to communication use for enhancing a directivity gain in a specific direction, particularly in the longitudinal direction of the case and in the zenith direction, obtaining a wider band, and improving efficiency.

What is claimed is:

1. A case cover attachable to a mobile communication terminal, the case cover comprising:
   a body part that is directly attachable to a case of the mobile communication terminal and includes a side surface and a back surface;
   a long coupling element that is able to be capacitively coupled to an antenna element of the mobile communication terminal, wherein the antenna element being disposed at a position in the case, the position being close to one end of the case, the antenna element has a feeding point for receiving electric power, the coupling element has a length of about $\lambda/2$ or more with respect to a communication wavelength $\lambda$, and the coupling element is placed in parallel with the back surface of the body part; and
   an engagement part that is formed on the side surface to engage with the case of the mobile communication terminal, wherein when the case cover supports the one end of the case of the mobile communication terminal by engaging the engagement part with the one end of the case of the mobile communication terminal, the one end of the case of the mobile communication terminal is placed near the coupling element, so that capacitive coupling between the antenna element and the coupling element is enabled and the back surface of the case cover is disposed so as to be relatively substantially orthogonal to a back cover of the mobile communication terminal, when the back surface of the case cover covers a back surface of the mobile communication terminal, the coupling element is placed near the back surface of the mobile communication terminal, the case cover further comprises an antenna part that is mounted to the body part so as to be relatively movable and includes the coupling element, in a case where the one end of the case of the mobile communication terminal is placed near the coupling element, the antenna part is disposed so as to be relatively substantially orthogonal to the body part, and the antenna part is mounted to the body part so as to be relatively turnable.

2. A case cover attachable to a mobile communication terminal, the case cover comprising:

a body part that is directly attachable to a case of the mobile communication terminal and includes a side surface and a back surface;

a long coupling element that is able to be capacitively coupled to an antenna element of the mobile communication terminal, wherein the antenna element being disposed at a position in the case, the position being close to one end of the case, the antenna element has a feeding point for receiving electric power, the coupling element has a length of about $\lambda/2$ or more with respect to a communication wavelength $\lambda$, and the coupling element is placed in parallel with the back surface of the body part; and an engagement part that is formed on the side surface to engage with the case of the mobile communication terminal, wherein when the case cover supports the one end of the case of the mobile communication terminal by engaging the engagement part with the one end of the case of the mobile communication terminal, the one end of the case of the mobile communication terminal is placed near the coupling element, so that capacitive coupling between the antenna element and the coupling element is enabled and the back surface of the case cover is disposed so as to be relatively substantially orthogonal to a back cover of the mobile communication terminal, when the back surface of the case cover covers a back surface of the mobile communication terminal, the coupling element is placed near the back surface of the mobile communication terminal, and the side surface is recessed to form the engagement part.

* * * * *